US012644743B2

(12) United States Patent
Hiramatsu et al.

(10) Patent No.: US 12,644,743 B2
(45) Date of Patent: Jun. 2, 2026

(54) MIST FLOW RATE MEASURING APPARATUS

(71) Applicant: TOSHIBA MITSUBISHI-ELECTRIC INDUSTRIAL SYSTEMS CORPORATION, Tokyo (JP)

(72) Inventors: Takahiro Hiramatsu, Tokyo (JP); Hiroyuki Orita, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 340 days.

(21) Appl. No.: 18/270,211

(22) PCT Filed: Nov. 26, 2021

(86) PCT No.: PCT/JP2021/043422
§ 371 (c)(1),
(2) Date: Jun. 29, 2023

(87) PCT Pub. No.: WO2023/095291
PCT Pub. Date: Jun. 1, 2023

(65) Prior Publication Data
US 2024/0085230 A1    Mar. 14, 2024

(51) Int. Cl.
G01F 1/7086 (2022.01)
G01F 1/74 (2006.01)

(52) U.S. Cl.
CPC .............. G01F 1/7086 (2013.01); G01F 1/74 (2013.01)

(58) Field of Classification Search
CPC ...................................................... G01F 1/7086
(Continued)

(56) References Cited

U.S. PATENT DOCUMENTS 4,914,955 A * 4/1990 Stonestrom ............. G01F 1/708
73/861.05
6,640,649 B1 * 11/2003 Paz ........................ A61B 5/208
73/861.41
(Continued)

FOREIGN PATENT DOCUMENTS

CN        107949328 A     4/2018
JP        S55-077139 U    5/1980
(Continued)

OTHER PUBLICATIONS

Office Action issued on Feb. 5, 2025, in corresponding Korean patent Application No. 10-2023-7019112, 9 pages.
(Continued)

*Primary Examiner* — John Fitzgerald
(74) *Attorney, Agent, or Firm* — XSENSUS LLP

(57) ABSTRACT

In a mist flow rate measuring apparatus of the present disclosure, an external discharge pipe is constituted of a combination of an upstream pipe, a large-diameter transparent pipe, and a downstream pipe. A part of a mist flowing region in the large-diameter transparent pipe is an imaging target region of a mist imaging camera. An inner diameter D31 of the large-diameter transparent pipe is set to a value larger than an inner diameter D7 of the upstream pipe and an inner diameter D8 of the downstream pipe. That is, the large-diameter transparent pipe, the upstream pipe, and the downstream pipe have a magnitude relationship with respect to the inner diameter of {D31>D7=D8}.

6 Claims, 24 Drawing Sheets

(58) Field of Classification Search

USPC ........................................ 73/861.05, 861.41

See application file for complete search history.

(56) References Cited

U.S. PATENT DOCUMENTS

| | | | | |
|---|---|---|---|---|
| 2017/0035342 | A1 | 2/2017 | Elia et al. | |
| 2019/0128718 | A1* | 5/2019 | McConkey | ........... G01M 15/14 |
| 2022/0349738 | A1* | 11/2022 | Meribout | ................. G01B 7/06 |
| 2024/0102841 | A1* | 3/2024 | Hiramatsu | ........... G01F 1/7086 |

FOREIGN PATENT DOCUMENTS

| | | | | | |
|---|---|---|---|---|---|
| JP | H09-33419 | A | | 2/1997 | |
| JP | 2007021608 | A | * | 2/2007 | ........ B23Q 11/1046 |
| JP | 2009-240898 | A | | 10/2009 | |
| JP | 2011155081 | A | * | 8/2011 | |
| JP | 6158336 | B2 | | 7/2017 | |
| KR | 101978351 | B1 | | 5/2019 | |
| WO | 2017/069204 | A1 | | 4/2017 | |

OTHER PUBLICATIONS

Office Action issued on Feb. 5, 2025, in Korean patent Application No. 10-2023-7019095, 9 pages.

Office Action issued on Jun. 8, 2023, in corresponding Taiwanese patent Application No. 111141615, 13 pages.

Notice of Reasons for Refusal mailed on May 23, 2023, received for JP Application 2022-532109, 7 pages including English Translation.

International Search Report and Written Opinion mailed on Jan. 18, 2022, received for PCT Application PCT/JP2021/043422, filed on Nov. 26, 2021, 8 pages including English Translation.

Office Action issued on Aug. 9, 2025, in corresponding Chinese patent Application No. 202180083210.X, 31 pages.

Office Action issued on Sep. 30, 2025, in related U.S. Appl. No. 18/270,213, 77 pages.

Notice of Reasons for Refusal mailed on May 23, 2023, received for JP Application 2022-532017, 7 pages including English Translation.

International Search Report and Written Opinion mailed on Jan. 18, 2022, received for PCT Application PCT/JP2021/043420, filed on Nov. 26, 2021, 8 pages including English Translation.

* cited by examiner

| | 1 | 2 | 3 | 4 | 5 | 6 | 7 | 8 | ... | N |
|---|---|---|---|---|---|---|---|---|---|---|
| 1 | 108 | 135 | 169 | 211 | 198 | 233 | 229 | 183 | ... | 117 |
| 2 | 113 | 141 | 177 | 221 | 213 | 215 | 227 | 182 | ... | 116 |
| 3 | 110 | 138 | 172 | 215 | 211 | 216 | 220 | 176 | ... | 113 |
| 4 | 114 | 142 | 178 | 222 | 217 | 219 | 220 | 176 | ... | 113 |
| 5 | 108 | 135 | 169 | 211 | 209 | 225 | 219 | 175 | ... | 112 |
| 6 | 118 | 147 | 184 | 230 | 216 | 219 | 211 | 169 | ... | 108 |
| 7 | 109 | 136 | 170 | 212 | 203 | 216 | 227 | 182 | ... | 116 |
| 8 | 102 | 127 | 159 | 199 | 213 | 218 | 219 | 175 | ... | 112 |
| ⋮ | ⋮ | ⋮ | ⋮ | ⋮ | ⋮ | ⋮ | ⋮ | ⋮ | | ⋮ |
| M | 115 | 144 | 180 | 225 | 226 | 233 | 221 | 177 | ... | 113 |

F I G. 4
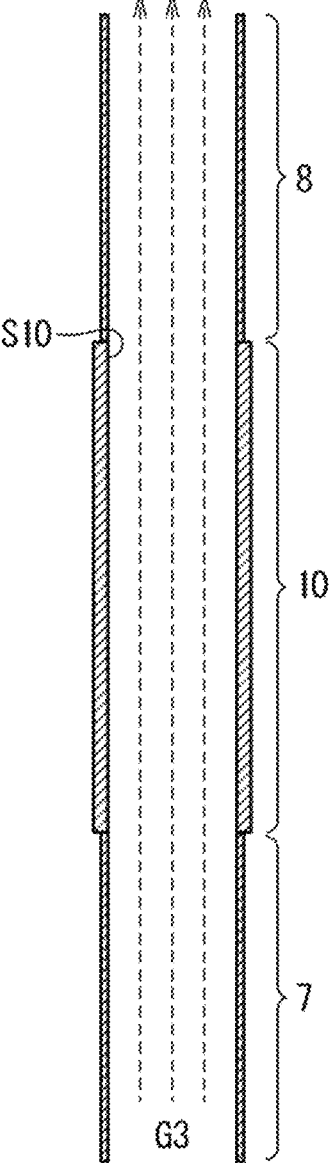
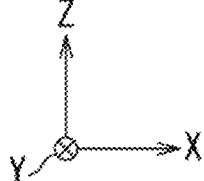

F I G. 5
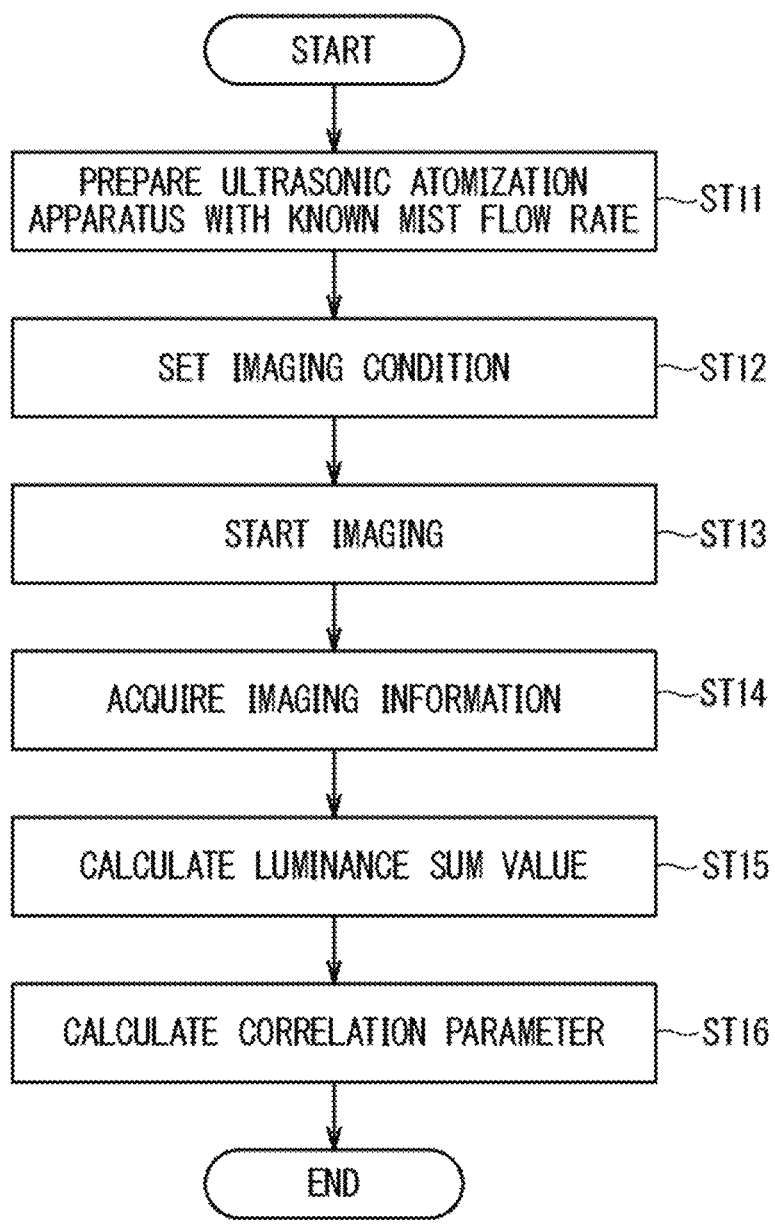

F I G. 7
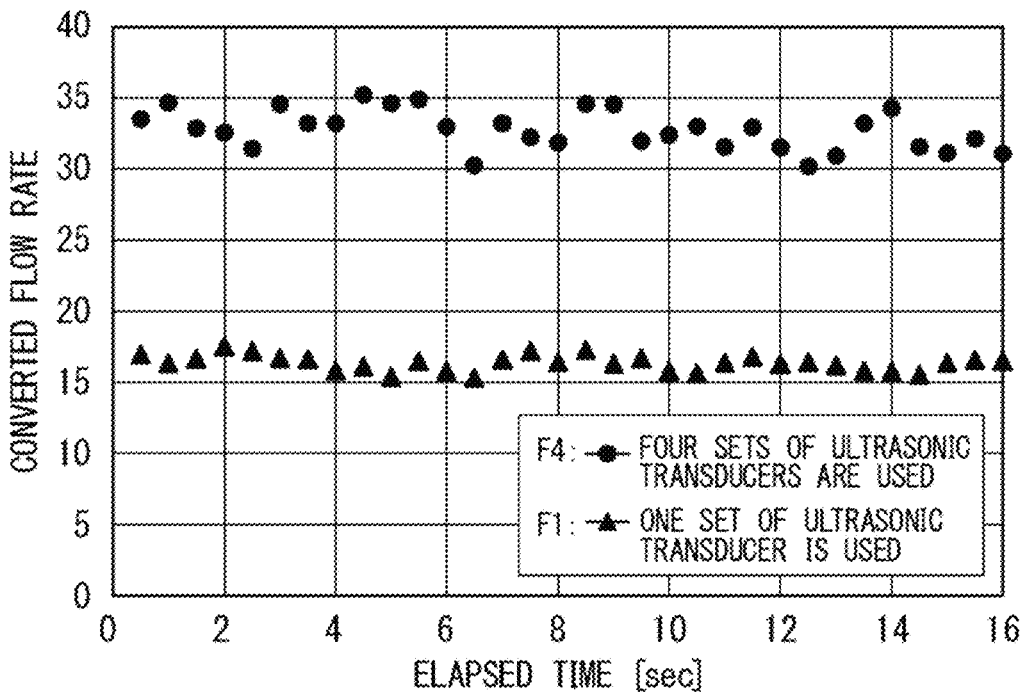
F I G. 8
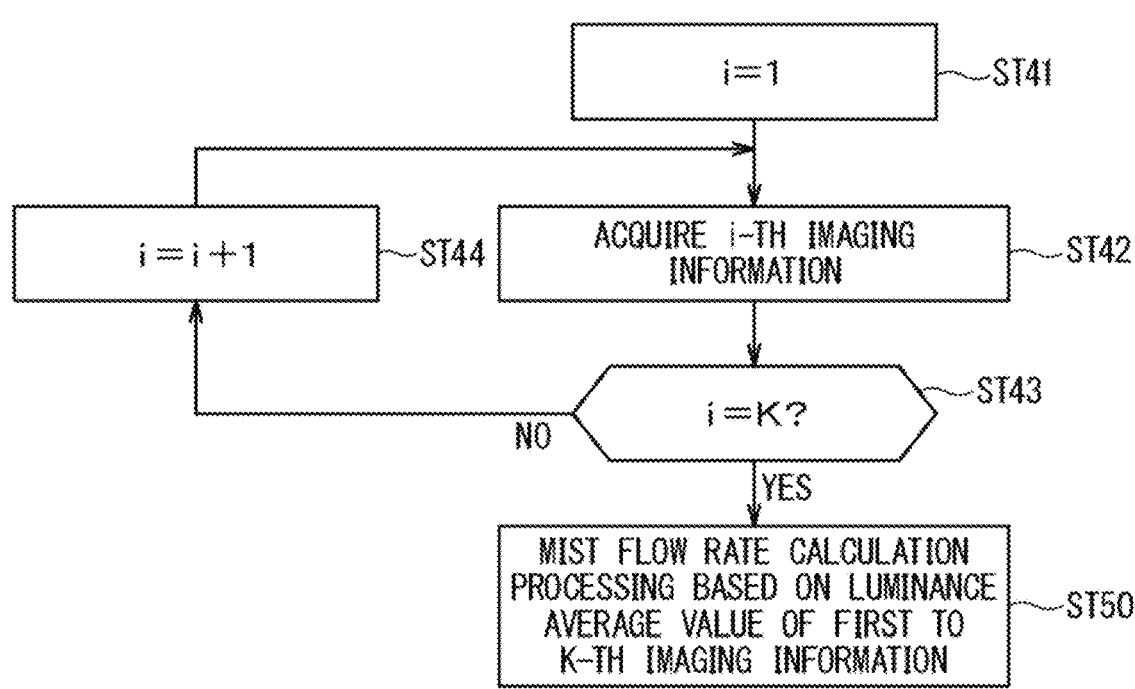

F I G . 1 2
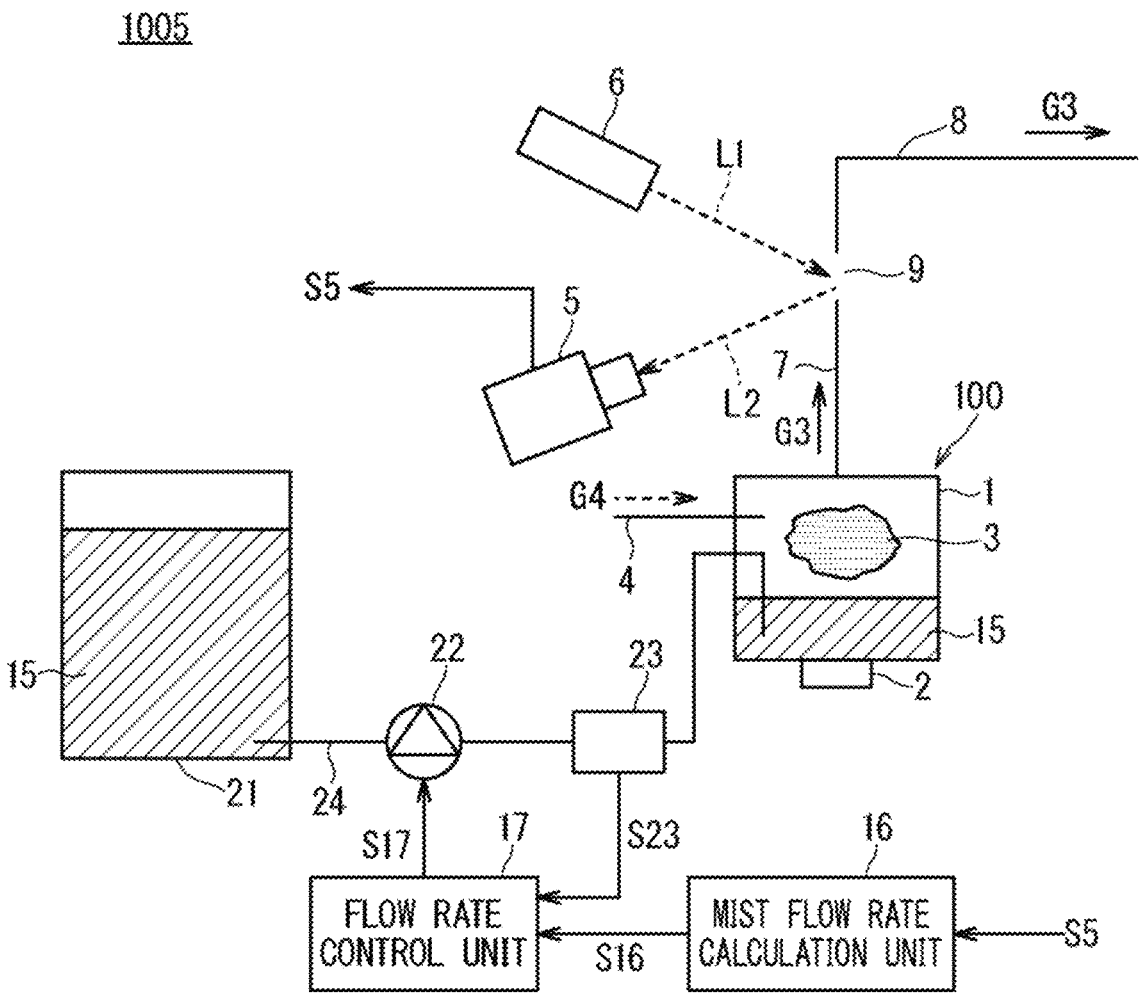

F I G . 1 8
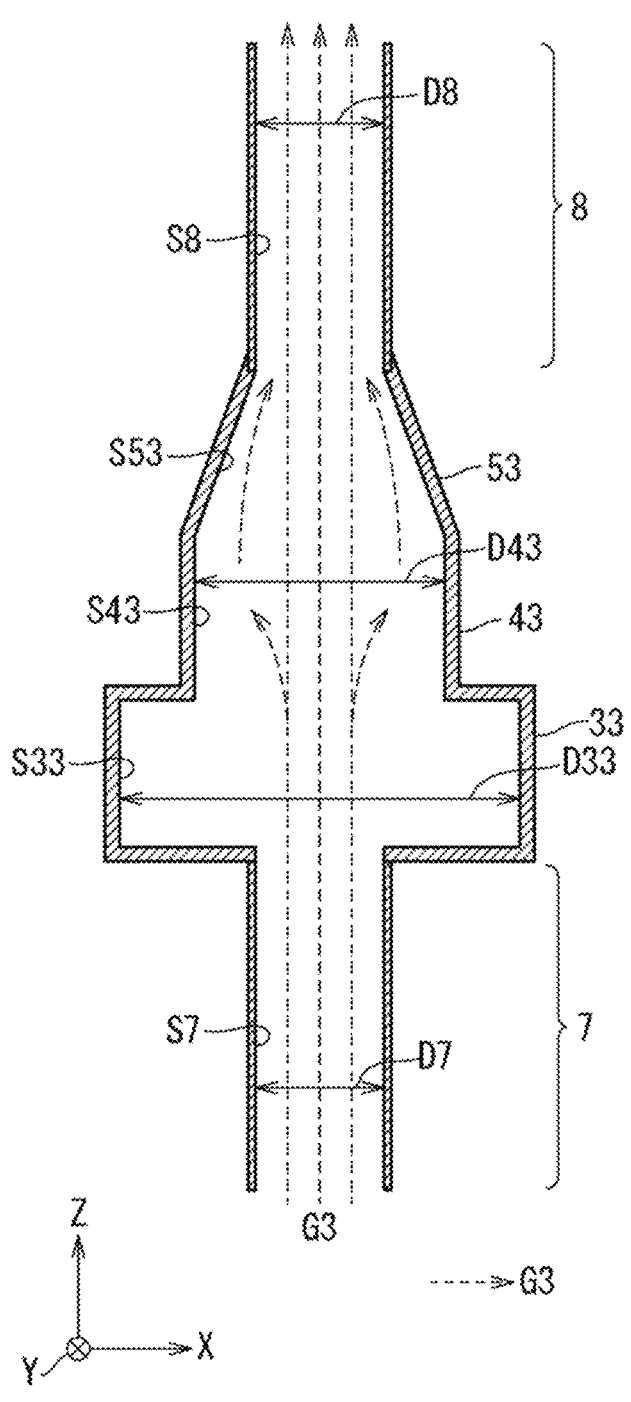

F I G. 2 4
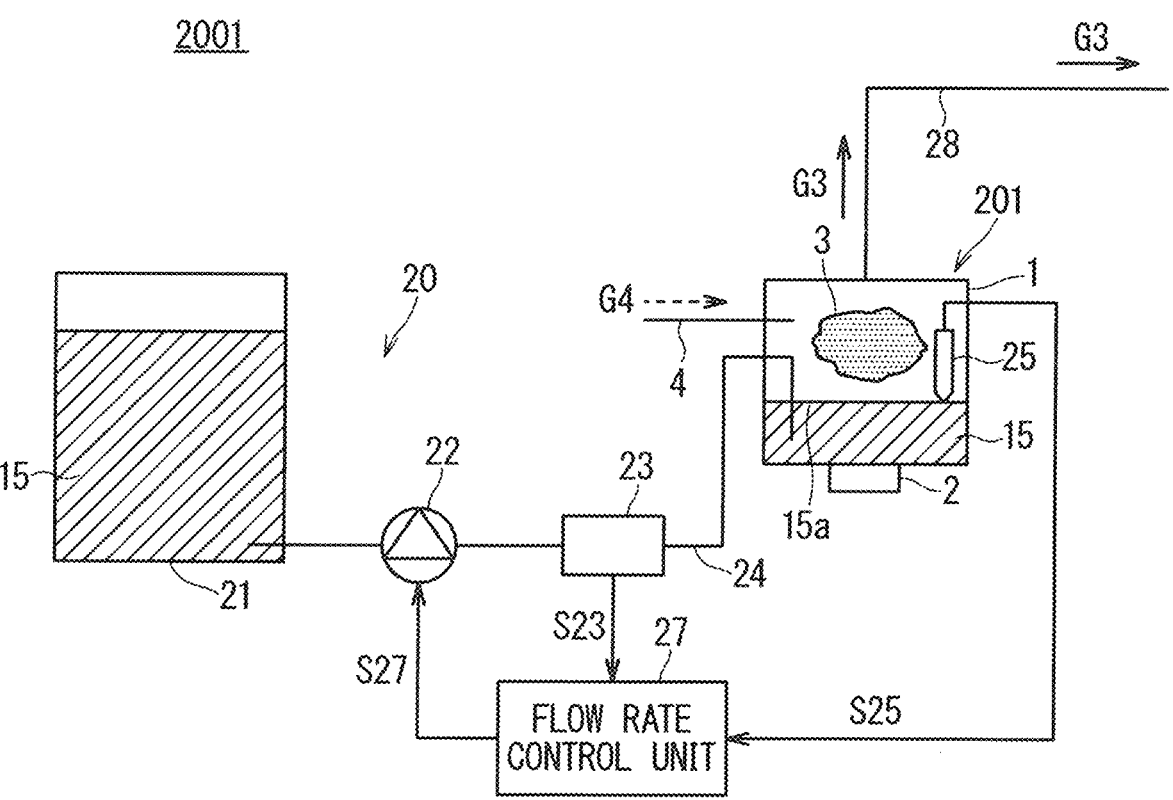

F I G. 2 5
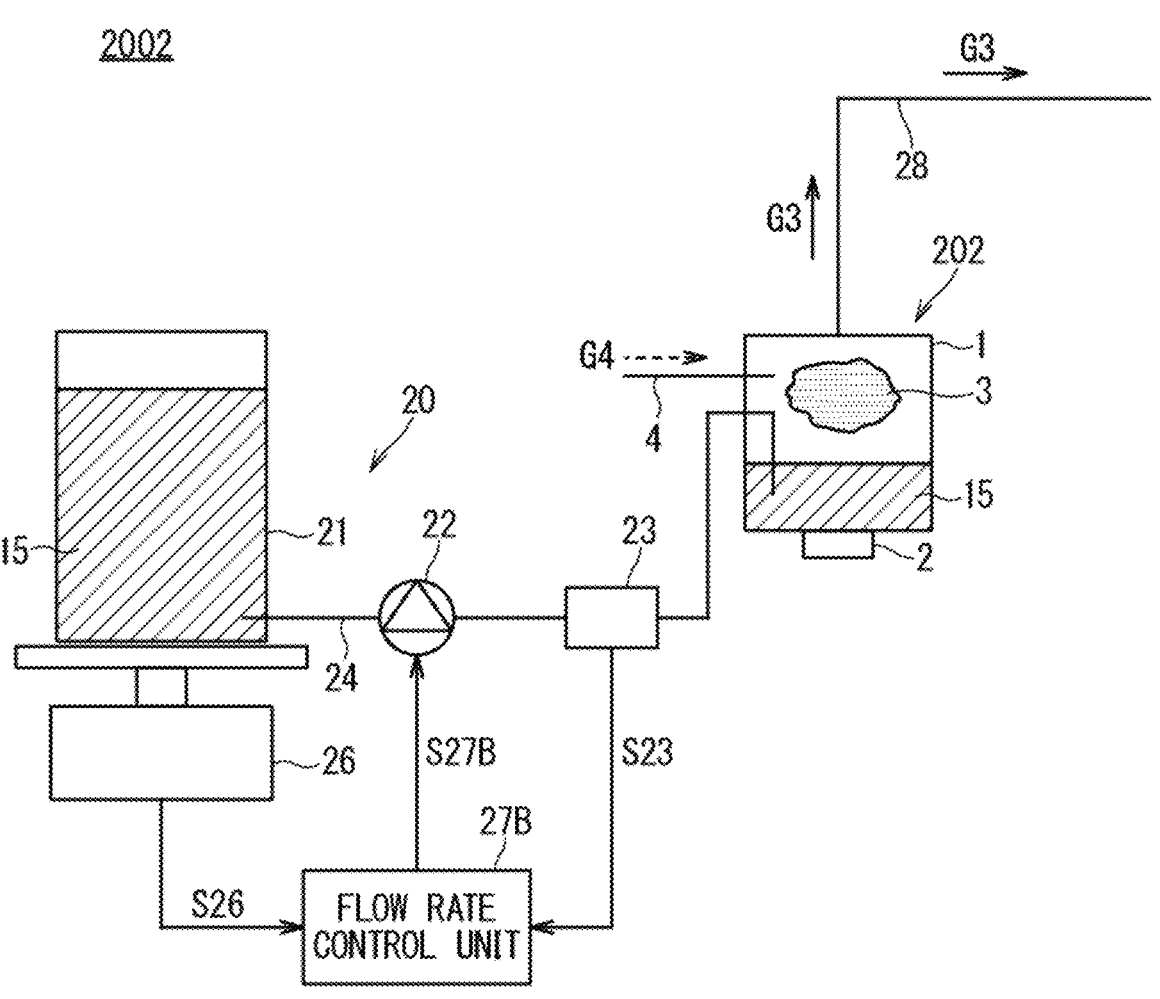

MIST FLOW RATE MEASURING APPARATUS

CROSS-REFERENCE TO RELATED APPLICATION

The present application is based on PCT filing PCT/JP2021/043422, filed Nov. 26, 2021, the entire contents of which are incorporated herein by reference. This application is also related to U.S. patent application Ser. No. 18/270, 213, entitled MIST FLOW RATE MEASURING APPARATUS, ULTRASONIC ATOMIZATION SYSTEM, AND MIST FLOW RATE MEASURING METHOD, filed Jun. 29, 2023.

TECHNICAL FIELD

The present invention relates to a mist flow rate measuring apparatus that measures a flow rate of a raw material mist under a situation where a mist-containing gas containing the raw material mist flows.

BACKGROUND ART

Conventionally, a method of measuring the flow rate of the mist contained in the mist-containing gas has not been established, and the flow rate of the mist has been indirectly measured by measuring an amount of consumption of a raw material solution in a liquid form before the solution turns into mist.

FIG. 24 is an explanatory view showing a configuration (part 1) of a conventional ultrasonic atomization system. As shown in FIG. 24, a conventional ultrasonic atomization system 2001 includes an ultrasonic atomization apparatus 201, a raw material solution supply unit 20, and a flow rate control unit 27 as main constituent elements.

The ultrasonic atomization apparatus 201 includes an atomization container 1, a liquid level position detection sensor 25, and an ultrasonic transducer 2 as main constituent elements.

A raw material solution 15 is accommodated in the atomization container 1. A predetermined number of the ultrasonic transducers 2 (only one is shown in FIG. 24) are disposed on the bottom surface of the atomization container 1.

In the ultrasonic atomization apparatus 201 thus configured, when the ultrasonic transducer 2 executes ultrasonic vibration processing for applying ultrasonic vibration, vibration energy of the ultrasonic wave is transmitted to the raw material solution 15 in the atomization container 1 via the bottom surface of the atomization container 1.

Then, the raw material solution 15 turns into mist having a particle size of 10 μm or less, thereby a raw material mist 3 is obtained in the atomization container 1.

A carrier gas G4 is supplied from the gas supply pipe 4 into the atomization container 1. The carrier gas G4 is supplied into the atomization container 1 at a predetermined flow rate in order to convey a raw material mist 3 to a mist utilization processing unit outside the ultrasonic atomization apparatus 201 via a mist gas pipe 28.

As a result, a mist-containing gas G3 containing the raw material mist 3 is conveyed to the outside in the mist gas pipe 28.

The atomization container 1 includes a liquid level position detection sensor 25 therein. The liquid level position detection sensor 25 is a sensor that can detect a liquid level height position of the raw material solution 15. A part of the liquid level position detection sensor 25 is immersed in the raw material solution 15. The liquid level position detection sensor 25 detects the position of a liquid level 15a of the raw material solution 15, and obtains sensor information S25 indicating the detected position of the liquid level 15a.

The raw material solution supply unit 20 includes a container 21, a pump 22, a flow meter 23, and a raw material solution supply side pipe 24 as main constituent elements. The container 21 contains the raw material solution 15. The flow meter 23 measures the flow rate flowing through the raw material solution supply side pipe 24, and obtains measured flow rate information S23 indicating the measured flow rate.

The flow rate control unit 27 receives the measured flow rate information S23 from the flow meter 23, and receives the sensor information S25 from the liquid level position detection sensor 25.

The flow rate control unit 27 constantly recognizes the flow rate of the raw material solution flowing through the raw material solution supply side pipe 24 by the measured flow rate indicated by the measured flow rate information S23.

The flow rate control unit 27 constantly recognizes an amount of change of the raw material solution 15 in the atomization container 1 from the position of the liquid level 15a of the raw material solution 15 indicated by the sensor information S25.

Based on the measured flow rate information S23 and the sensor information S25, the flow rate control unit 27 executes raw material supply control processing of outputting a pump drive signal S27 instructing a driving amount of the pump 22 so as to satisfy a flow rate control condition to be described later.

The above-described flow rate control condition is a condition that "the position of the liquid level 15a of the raw material solution 15 indicated by the sensor information S25 is within an allowable range from a predetermined liquid level height".

In the conventional ultrasonic atomization system 2001, a first flow rate estimation method is adopted in which the amount of change of the raw material solution 15 in the atomization container 1 from the predetermined liquid level is recognized from the sensor information S25 obtained from the liquid level position detection sensor 25, and the flow rate of the raw material mist 3 contained in the mist-containing gas G3 is estimated from the recognized amount of change of the raw material solution 15.

FIG. 25 is an explanatory view showing a configuration (part 2) of a conventional ultrasonic atomization system. As shown in FIG. 25, a conventional ultrasonic atomization system 2002 includes an ultrasonic atomization apparatus 202, a raw material solution supply unit 20, a weighing meter 26, and a flow rate control unit 27B as main constituent elements.

Hereinafter, the same constituent elements as those of the ultrasonic atomization system 2001 shown in FIG. 24 are denoted by the same reference numerals, the description thereof are omitted as appropriate, and feature portions of the ultrasonic atomization system 2002 are mainly described.

The ultrasonic atomization apparatus 202 includes an atomization container 1 and an ultrasonic transducer 2 as main constituent elements. The ultrasonic atomization apparatus 202 is different from the ultrasonic atomization apparatus 201 in that the liquid level position detection sensor 25 is not provided.

The raw material solution supply unit 20 includes a container 21, a pump 22, a flow meter 23, and a raw material solution supply side pipe 24 as main constituent elements. The raw material solution supply unit 20 supplies a raw material solution 15 to the ultrasonic atomization apparatus 202.

In the raw material solution supply unit 20, the container 21 stores the raw material solution 15. The flow meter 23 measures the flow rate flowing through the raw material solution supply side pipe 24, and obtains measured flow rate information S23 indicating the measured flow rate.

The weighing meter 26 supports the container 21 in a manner that the weight of the container can be measured. The weighing meter 26 measures the weight of the container 21 containing the raw material solution 15 and outputs a weighing signal S26 indicating the weight.

The flow rate control unit 27B receives the measured flow rate information S23 from the flow meter 23, and receives the weighing signal S26 from the weighing meter 26.

The flow rate control unit 27B constantly recognizes the flow rate of the raw material solution flowing through the raw material solution supply side pipe 24 by the measured flow rate indicated by the measured flow rate information S23.

The flow rate control unit 27B constantly recognizes the remaining amount of the raw material solution 15 in the container 21 from the weight of the container 21 indicated by the weighing signal S26.

Based on the measured flow rate information S23 and the weighing signal S26, the flow rate control unit 27B executes the raw material supply control processing of outputting a pump drive signal S27B instructing a driving amount of the pump 22 so as to satisfy the flow rate control condition to be described later.

The above-described flow rate control condition is a condition that "an amount of change per unit time of the weight indicated by the weighing signal S26 is within an allowable range".

In the conventional ultrasonic atomization system 2002, the amount of change of the raw material solution 15 in the container 21 is recognized from the weighing signal S26 obtained by the weighing meter 26. Then, the ultrasonic atomization system 2002 adopts a second flow rate estimation method of estimating the flow rate of a raw material mist 3 contained in a mist-containing gas G3 from the amount of change of the raw material solution 15 in the container 21.

The second flow rate estimation method is used in, for example, the atomization apparatus disclosed in Patent Document 1.

PRIOR ART DOCUMENT

Patent Document

Patent Document 1: Japanese Patent No. 6158336

SUMMARY

Problem to be Solved by the Invention

However, the conventional first and second flow rate estimation methods indirectly obtain the flow rate of the raw material mist 3 based on the amount of change of the raw material solution 15 in the atomization container 1 or the amount of change of the raw material solution 15 in the container 21.

For this reason, in the conventional flow rate measuring method of the raw material mist 3, the following estimation error factors (1) and (2) occur.

(1) There is a time lag between the flow of the mist-containing gas G3 containing the raw material mist 3 and the timing of consuming the raw material solution 15.

(2) When the atomization efficiency of turning the raw material mist 3 into a mist from the raw material solution 15 becomes lower than that at the time of setting, the deviation of the estimated flow rate from the true flow rate of the raw material mist 3 increases by the amount of the decrease.

As described above, the conventional method for measuring the flow rate of the raw material mist 3 including the first and second flow rate estimation methods has a problem that the flow rate of the raw material mist 3 cannot be accurately measured because of the above-described estimated error factors.

An object of the present disclosure is to provide a mist flow rate measuring apparatus that can solve the above-described problems and accurately obtain the flow rate of the raw material mist.

Means to Solve the Problem

A mist flow rate measuring apparatus of the present disclosure includes: a mist imaging camera that executes imaging processing with at least a part of a mist flowing region through which a mist-containing gas containing a raw material mist flows set as an imaging target region to acquire imaging information; a mist flow rate calculation unit that executes mist flow rate calculation processing of obtaining a flow rate of the raw material mist in the mist-containing gas based on the imaging information; first and second gas supply pipes each having the mist flowing region inside; and an imaging pipe having the mist flowing region inside, in which the first and second gas supply pipes each have a cross-sectional shape of a circular shape having a constant inner diameter, the imaging pipe has a cross-sectional shape of a circular shape, and at least a part of the imaging pipe has a constant inner diameter region with a constant inner diameter, the imaging pipe is provided between the first gas supply pipe and the second gas supply pipe, and is constituted of a material having transparency, a part of the mist flowing region in the imaging pipe is the imaging target region, the mist-containing gas flows in an order of the first gas supply pipe, the imaging pipe, and the second gas supply pipe along a predetermined direction opposing a vertical direction, and the constant inner diameter region in the imaging pipe has an inner diameter that is larger than an inner diameter of each of the first and second gas supply pipes.

Effects of the Invention

In the mist flow rate measuring apparatus of the present disclosure, because the inner diameter of the constant inner diameter region in the imaging pipe is larger than the inner diameter of each of the first and second gas supply pipes, a first inner surface difference distance is generated between the inner surface of the constant inner diameter region in the imaging pipe and the inner surface of the first gas supply pipe, and a second inner surface difference distance is generated between the inner surface of the constant inner diameter region in the imaging pipe and the inner surface of the second gas supply pipe.

When the mist-containing gas is propagated from the first gas supply pipe to the imaging pipe, the possibility that the mist-containing gas reaches the inner surface of the constant inner diameter region in the imaging pipe can be reduced by the portion where the first inner surface difference distance is generated.

Meanwhile, when the mist-containing gas is propagated from the imaging pipe to the second gas supply pipe, there is a possibility that a part of the mist-containing gas is reflected back from the second gas supply pipe. However, by the portion where the second inner surface difference distance is generated, the possibility that a part of the reflected mist-containing gas reaches the inner surface of the constant inner diameter region in the imaging pipe can be reduced.

As a result, the mist flow rate measuring apparatus of the present disclosure can accurately measure the flow rate of the raw material mist by suppressing the generation of dew condensation on the inner surface of the constant inner diameter region in the imaging pipe and satisfactorily executing the imaging processing by the mist imaging camera.

The objects, features, aspects, and advantages of the present invention will become more apparent from the following detailed description and the accompanying drawings.

BRIEF DESCRIPTION OF DRAWINGS

FIG. 3 is an explanatory view showing an example of imaging information of the camera shown in FIG. 1.

FIG. 4 is an explanatory view showing a cross-sectional structure of an upstream pipe, a transparent pipe, and a downstream pipe shown in FIG. 1.

FIG. 5 is a flowchart showing a processing procedure of calculating a correlation parameter.

FIG. 7 is a graph showing an example of a measurement result of a mist flow rate by a mist flow rate measuring apparatus of the first embodiment.

FIG. 8 is a flowchart showing imaging processing and mist flow rate calculation processing according to a modification of the first embodiment.

FIG. 12 is an explanatory view showing a configuration of an ultrasonic atomization system according to a fifth embodiment of the present disclosure.

FIG. 18 is an explanatory view showing cross-sectional structures of an upstream pipe, a large-diameter transparent pipe, an intermediate pipe, a tapered pipe, and a downstream pipe in a mist flow rate measuring apparatus of an eighth embodiment.

FIG. 24 is an explanatory view showing a configuration (part 1) of a conventional ultrasonic atomization system.

FIG. 25 is an explanatory view showing a configuration (part 2) of a conventional ultrasonic atomization system.

DESCRIPTION OF EMBODIMENTS

First Embodiment

Figure 1:
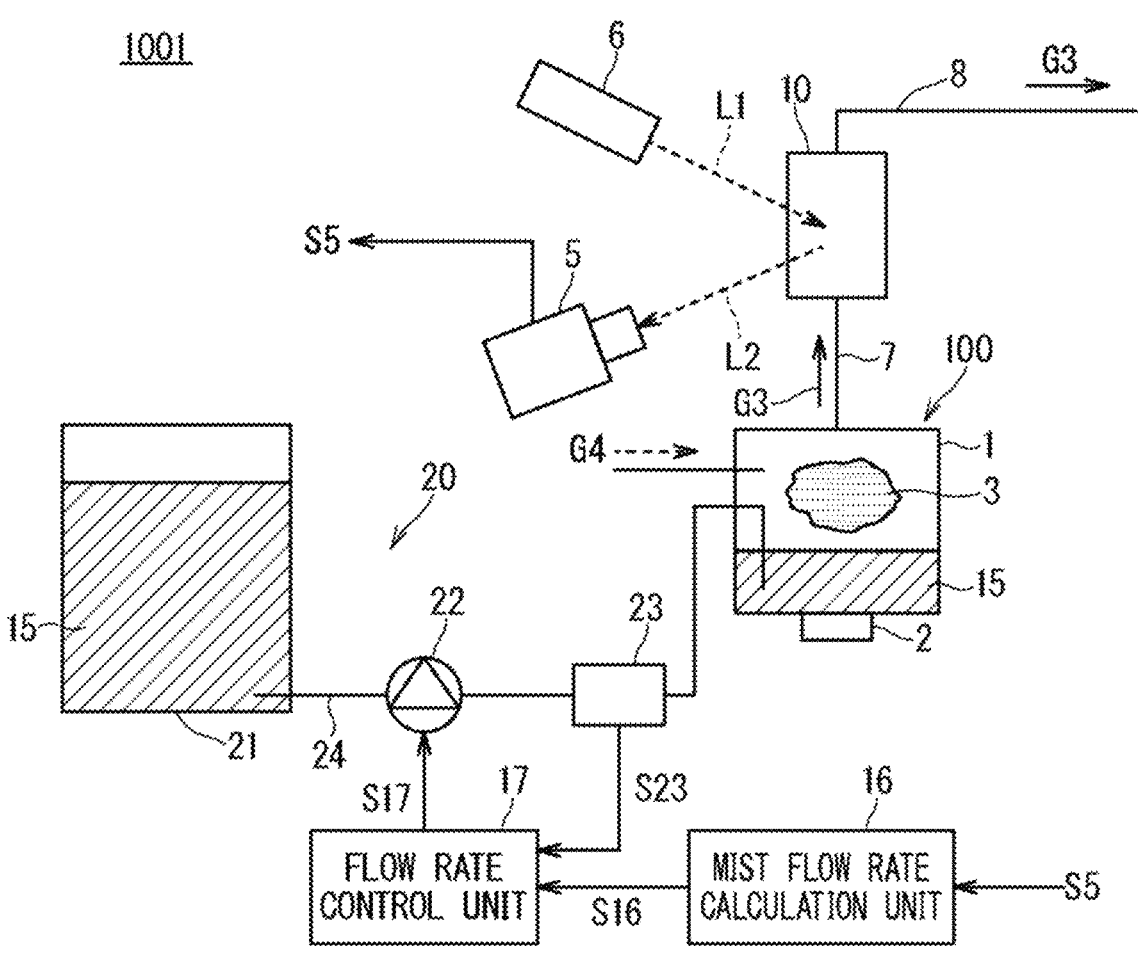
FIG. 1 is an explanatory view showing a configuration of an ultrasonic atomization system according to a first embodiment of the present disclosure.

FIG. 1 is an explanatory view showing a configuration of an ultrasonic atomization system 1001 according to a first embodiment of the present disclosure. The ultrasonic atomization system 1001 includes a mist flow rate measuring apparatus of the first embodiment. The mist flow rate measuring apparatus of the first embodiment includes a camera 5, a light source 6, a transparent pipe 10, and a mist flow rate calculation unit 16 as main constituent elements.

As shown in FIG. 1, the ultrasonic atomization system 1001 includes, in addition to the mist flow rate measuring apparatus described above, an ultrasonic atomization apparatus 100, a raw material solution supply unit 20, a flow rate control unit 17, an upstream pipe 7, and a downstream pipe 8 as main constituent elements. The upstream pipe 7 and the downstream pipe 8 serve as auxiliary members of the mist flow rate measuring apparatus for providing the transparent pipe 10.

The upstream pipe 7, the transparent pipe 10, and the downstream pipe 8 are coupled to each other, and the combination of the pipes 7, 10, and 8 constitutes an external discharge pipe for a mist-containing gas G3. The upstream pipe 7 serves as a first gas supply pipe, the downstream pipe 8 serves as a second gas supply pipe, and the transparent pipe 10 serves as an imaging pipe.

The ultrasonic atomization apparatus 100 includes an atomization container 1 and an ultrasonic transducer 2 as main constituent elements.

A raw material solution 15 is accommodated in the atomization container 1. A predetermined number of the ultrasonic transducers 2 (only one is shown in FIG. 1) are disposed on the bottom surface of the atomization container 1. As the raw material solution 15, for example, a material solution containing a metal element such as aluminum (Al) or zinc (Zn) are possible.

In the ultrasonic atomization apparatus 100 thus configured, when the ultrasonic transducer 2 executes ultrasonic vibration processing for applying ultrasonic vibration, vibration energy of the ultrasonic wave is transmitted to the raw material solution 15 in the atomization container 1 via the bottom surface of the atomization container 1.

Then, the raw material solution 15 turns into mist having a particle size of 10 μm or less, thereby a raw material mist 3 is obtained in the atomization container 1.

Meanwhile, a carrier gas G4 is supplied from a gas supply pipe 4 into the atomization container 1. The carrier gas G4 is supplied into the atomization container 1 at a predetermined flow rate in order to convey the raw material mist 3 in the atomization container 1 to a mist utilization processing unit outside the ultrasonic atomization apparatus 100 via the external discharge pipe such as the upstream pipe 7. As the carrier gas G4, for example, a high concentration inert gas can be adopted.

As a result, the mist-containing gas G3 containing the raw material mist 3 propagates in the external discharge pipe including a combination of the upstream pipe 7, the transparent pipe 10, and the downstream pipe 8, and is finally supplied to the outside. The mist-containing gas G3 means a gas in a state where the raw material mist 3 is conveyed by the carrier gas G4.

The raw material solution supply unit 20 includes a container 21, a pump 22, a flow meter 23, and a raw material solution supply side pipe 24 as main constituent elements. The container 21 contains the raw material solution 15. The flow meter 23 measures the flow rate flowing through the raw material solution supply side pipe 24, and obtains measured flow rate information S23 indicating the measured flow rate.

As described above, the mist-containing gas G3 containing the raw material mist 3 is supplied to the outside from the atomization container 1 via the upstream pipe 7, the transparent pipe 10, and the downstream pipe 8. Each of the upstream pipe 7, the transparent pipe 10, and the downstream pipe 8 serves as a flow path of the mist-containing gas G3 in the inside thereof. That is, each of the upstream pipe 7 and the downstream pipe 8 has the mist flowing region therein.

As described above, the ultrasonic atomization apparatus 100 performs the ultrasonic vibration processing on the raw material solution 15 by the ultrasonic transducer 2 to generate the raw material mist 3, and causes the carrier gas G4 to flow the mist-containing gas G3 into the mist flowing region.

In the mist flow rate measuring apparatus of the first embodiment, a part of the mist flowing region in the transparent pipe 10, which is an imaging pipe, is an imaging target region of the camera 5 which is a mist imaging camera.

The light source 6 irradiates the imaging target region in the transparent pipe 10 with incident light L1. Then, the incident light L1 is reflected in the imaging target region of the mist-containing gas G3, and reflected light L2 is obtained.

Then, the camera 5, which is the mist imaging camera, executes imaging processing of imaging the reflected light L2. That is, the imaging processing by the camera 5 is imaging processing on the reflected light L2, the processing having at least a part of the mist flowing region where the mist-containing gas G3 including the raw material mist 3 flows set as the imaging target region.

The camera 5 executes the imaging processing to acquire imaging information S5. The imaging information S5 indicates a plurality of luminance values in a plurality of pixels corresponding to the imaging target region.

Figure 2:
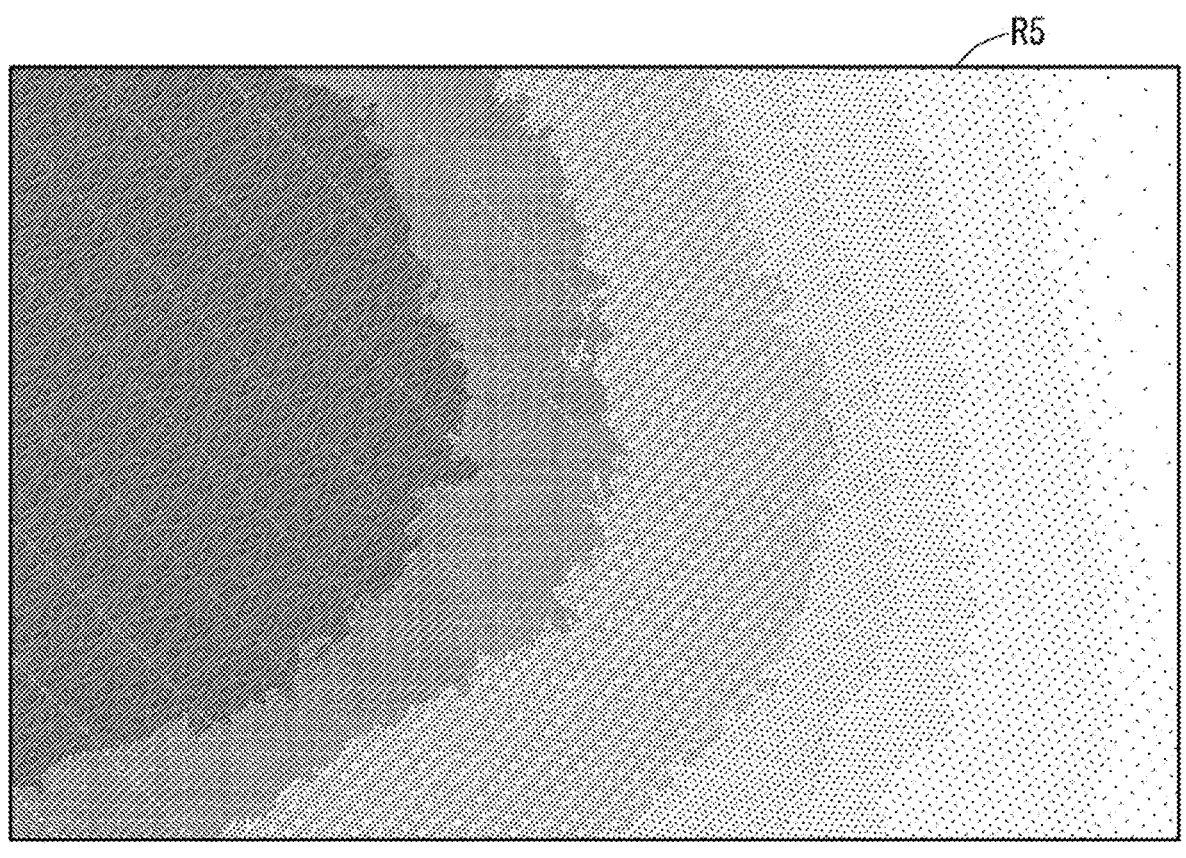
FIG. 2 is an explanatory view showing an example of an imaging result by a camera shown in FIG. 1.

FIG. 2 is an explanatory view showing an example of an imaging result by the camera 5. FIG. 3 is an explanatory view showing an example of the imaging information S5.

When the camera 5 executes the imaging processing of imaging the reflected light L2, the imaging result in an imaging target region R5 is obtained as shown in FIG. 2. In the imaging target region R5, a black region having a high density indicates a state in which luminance is higher than that in a black region having a low density.

The camera 5 executes internal calculation processing from the imaging result as shown in FIG. 2 to obtain the imaging information S5 as shown in FIG. 3.

In the imaging information S5, as shown in FIG. 3, a plurality of pixels arranged in a matrix of N (≥2)×M (≥2) corresponds to the imaging target region R5, and each of the plurality of pixels has a luminance value. FIG. 3 shows that the larger the luminance value indicated by the pixel, the higher the luminance.

As described above, the imaging information S5 is information indicating the plurality of luminance values in the plurality of pixels. Note that the imaging result shown in FIG. 2 and the imaging information S5 shown in FIG. 3 are merely examples, and there is no correlation therebetween.

The mist flow rate calculation unit 16 executes mist flow rate calculation processing of obtaining the flow rate of the raw material mist 3 in the mist-containing gas G3 based on the imaging information S5 obtained from the camera 5, and obtains mist flow rate information S16 indicating the flow rate of the raw material mist 3. The mist flow rate information S16 is given to the flow rate control unit 17.

The mist flow rate calculation processing by the mist flow rate calculation unit 16 includes sum value calculation processing and flow rate derivation processing described below.

Sum value calculation processing . . . Processing of obtaining a luminance sum value, which is a sum of the plurality of luminance values indicated by the imaging information S5

Flow rate derivation processing . . . Processing of deriving the flow rate of raw material mist 3 from the luminance sum value obtained by the sum value calculation processing As described above, the mist flow rate calculation unit 16 executes the mist flow rate calculation processing including the sum value calculation processing and the flow rate derivation processing based on the plurality of luminance values indicated by the imaging information S5.

FIG. 4 is an explanatory view showing a cross-sectional structure of the upstream pipe 7, the transparent pipe 10, and the downstream pipe 8. In FIG. 4, an XYZ orthogonal coordinate system is shown.

As shown in the drawing, the upstream pipe 7, the transparent pipe 10, and the downstream pipe 8 constituting the external discharge pipe are disposed along the Z direction parallel to the vertical direction, and the upstream pipe 7 and the transparent pipe 10, and the transparent pipe 10 and the downstream pipe 8, are respectively coupled to each other.

Therefore, the mist-containing gas G3 supplied from the ultrasonic atomization apparatus 100 flows inside each of the upstream pipe 7, the transparent pipe 10, and the downstream pipe 8 along the +Z direction. In other words, a flow path of the mist-containing gas G3 is provided in each of the upstream pipe 7, the transparent pipe 10, and the downstream pipe 8. The cross-sectional shape of each of the upstream pipe 7, the transparent pipe 10, and the downstream pipe 8 is a circular shape having a constant inner diameter, and the inner diameters of the upstream pipe 7, the transparent pipe 10, and the downstream pipe 8 are set to be equal to each other.

A constituent material of the transparent pipe 10, which is the imaging pipe, has transparency. Further, a constituent material of a pipe inner surface S10 of the transparent pipe 10 has hydrophilicity. Note that the thickness of each of the upstream pipe 7, the transparent pipe 10, and the downstream pipe 8 is optionally set.

FIG. 5 is a flowchart showing a processing procedure of calculating a correlation parameter for obtaining the flow rate of the raw material mist 3. The calculation processing of the correlation parameter is performed prior to the actual operation of the mist flow rate measuring apparatus of the first embodiment.

Referring to the drawing, in step ST11, a predetermined ultrasonic atomization apparatus having a known flow rate of the raw material mist 3 is prepared. Here, a flow rate value of the raw material mist 3 is defined as a mist flow rate MF.

Then, in step ST12, an imaging condition by the camera 5 is set. This imaging condition is the same as an imaging condition of the camera 5 during the actual operation of the mist flow rate measuring apparatus of the first embodiment. Note that the camera 5 is a camera for the mist flow rate measuring apparatus of the first embodiment.

The imaging condition possibly includes, for example, an amount of light and wavelength of the light source 6, an angle of irradiating the transparent pipe 10 with the incident light L1, an imaging position of the camera 5, an imaging target region, an imaging light type (reflected light or transmitted light), and the like. Note that the flow rate of the carrier gas G4 in the predetermined ultrasonic atomization apparatus is desirably set to be the same as the flow rate of the carrier gas G4 in the ultrasonic atomization apparatus 100.

Thereafter, in step ST13, the imaging processing by the camera 5 is started, and in step ST14, the camera 5 executes the imaging processing on the reflected light L2 to acquire the imaging information S5.

Then, in step ST15, the luminance sum value that is the sum of the plurality of luminance values indicated by the imaging information S5 is calculated. Here, it is assumed that a luminance sum value LS is calculated.

Thereafter, in step ST16, a correlation parameter K1 is calculated. The mist flow rate ME and the luminance sum value LS have a certain correlation. For example, it is assumed that there is a relationship in which the mist flow rate MF is expressed as a linear function of the luminance sum value LS as shown in Expression (1).

$$MF=K1 \cdot LS+c1 \qquad (1)$$

where c1 is a constant.

In this case, the correlation parameter K1 can be calculated from the following Expression (2) based on Expression (1).

$$K1=(MF-c1)/LS \qquad (2)$$

As described above, the correlation parameter K1 that can be calculated by the flow shown in FIG. 5 can be prepared in advance for the mist flow rate measuring apparatus of the first embodiment.

Figure 6:
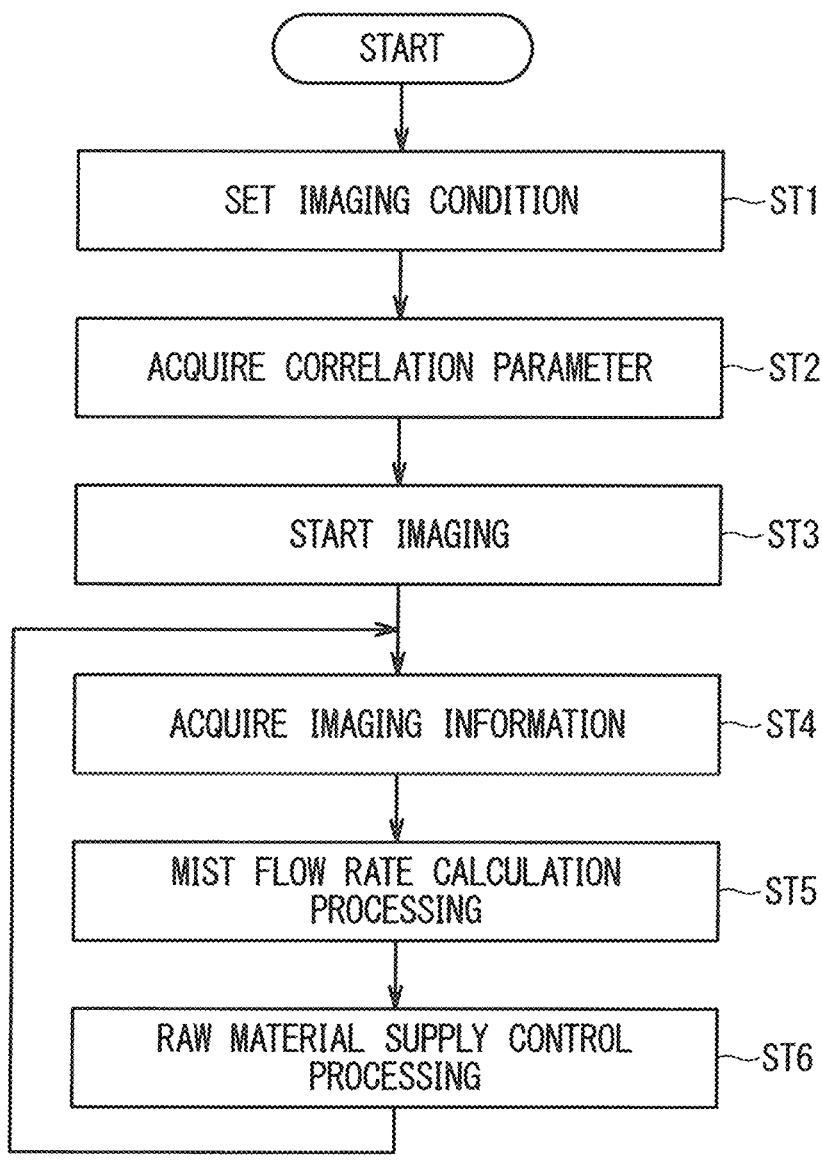
FIG. 6 is a flowchart showing a processing procedure of a method of controlling a raw material solution in the ultrasonic atomization system of the first embodiment.

FIG. 6 is a flowchart showing a processing procedure of a method of controlling the raw material solution 15 in the ultrasonic atomization system of 1001 shown in FIG. 1. This flow includes a mist flow rate measuring method by the mist flow rate measuring apparatus of the first embodiment. Hereinafter, control contents of the ultrasonic atomization system 1001 are described with reference to the drawing.

First, in step ST1, the imaging condition in the mist flow rate measuring apparatus of the first embodiment is set. Here, the imaging condition has the same contents as those at the time of calculating the correlation parameter K1 shown in FIG. 5.

Next, in step ST2, the mist flow rate calculation unit 16 acquires the correlation parameter K1. As a method for acquiring the correlation parameter K1, for example, a method can be used in which the correlation parameter K1 is stored in an external storage apparatus (not shown) and the mist flow rate calculation unit 16 acquires the correlation parameter K1 as necessary.

As described above, step ST2 is a step of acquiring the correlation parameter K1 for deriving the mist flow rate MF from the luminance sum value of the plurality of luminance values.

Thereafter, in step ST3, the mist flow rate measuring apparatus of the first embodiment starts the imaging processing on the reflected light L2 by the camera 5, and in step ST4, the camera 5 executes the imaging processing on the reflected light L2 to acquire the imaging information S5.

Step ST4 described above is a step of executing, using the camera 5, the imaging processing with at least a part of the mist flowing region where the mist-containing gas G3 flows set as the imaging target region to acquire the imaging information S5.

Note that the acquisition processing of the correlation parameter K1 in step ST2 described above may be executed after execution of step ST4 and before execution of step ST5.

Then, in step ST5, the mist flow rate calculation unit 16 executes mist flow rate calculation processing to calculate the mist flow rate MF. Hereinafter, the mist flow rate calculation processing is described in detail.

The mist flow rate calculation unit 16 first executes sum value calculation processing of obtaining the luminance sum value that is a sum of the plurality of luminance values indicated by the imaging information S5. Thereafter, the mist flow rate calculation unit 16 executes the flow rate derivation processing of deriving the mist flow rate MF from the luminance sum value obtained by the sum value calculation processing.

For example, when the luminance sum value obtained by the sum value calculation processing is denoted by LS, the mist flow rate MF can be obtained by the following Expression (1A) to which Expression (1) described above is applied.

$$MF=K1LS+c1 \qquad (1A)$$

As described above, in the processing of step ST5, the mist flow rate calculation processing is executed, the processing obtaining the mist flow rate MF in the mist-containing gas G3 from the luminance sum value LS of the plurality of luminance values using the correlation parameter K1 based on the imaging information S5.

Therefore, the mist flow rate measuring apparatus of the first embodiment can measure the mist flow rate MF based on the imaging information S5 by executing the mist flow rate measuring method including steps ST1 to ST5. Note that for a unit of the mist flow rate MF, for example, (L (liter)/min) is possible.

The mist flow rate information S16 indicating the mist flow rate MF calculated by the mist flow rate calculation unit 16 is output to the flow rate control unit 17 of the next stage.

In step ST6, the flow rate control unit 17 of the ultrasonic atomization system 1001 executes raw material supply control processing of controlling a supply state of the raw material solution 15 supplied from the container 21 of the raw material solution supply unit 20 to the atomization container 1. Hereinafter, details of processing contents of step ST6 by the flow rate control unit 17 are described.

The flow rate control unit 17, which is the raw material supply control unit, receives the measured flow rate information S23 from the flow meter 23, and receives the mist flow rate information S16 from the mist flow rate calculation unit 16.

The flow rate control unit 17 constantly recognizes the flow rate of the raw material solution flowing through the raw material solution supply side pipe 24 by the measured flow rate indicated by the measured flow rate information S23.

The flow rate control unit 17 constantly recognizes the flow rate of the raw material mist 3 by the mist flow rate MF indicated by the mist flow rate information S16.

Based on the measured flow rate information S23 and the mist flow rate information S16, the flow rate control unit 17 executes the raw material supply control processing of outputting a pump drive signal S17 instructing a driving amount of the pump 22 so as to satisfy a flow rate control condition to be described later. The flow rate control condition is, for example, a condition that "the mist flow rate MF indicated by the mist flow rate information S16 is within an allowable range from a reference mist flow rate".

As described above, the flow rate control unit 17 recognizes the flow rate of the raw material mist 3 generated by the ultrasonic atomization apparatus 100 based on the mist flow rate information S16 obtained from the mist flow rate calculation unit 16, and executes the raw material supply control processing to make the recognized flow rate of the raw material mist 3 become the predetermined flow rate within the allowable range from the reference mist flow rate.

FIG. 7 is a graph showing an example of a measurement result of the mist flow rate MF by the mist flow rate measuring apparatus of the first embodiment. In the drawing, the horizontal axis represents the elapsed time (sec), and the vertical axis represents the converted flow rate (value) (optional unit) based on the mist flow rate MF.

In the drawing, a converted flow rate F1 indicates a case where the ultrasonic vibration processing is executed by one ultrasonic transducer 2, and a converted flow rate F4 indicates a case where the ultrasonic vibration processing is executed by four ultrasonic transducers 2. As shown in the drawing, the converted flow rate F4 is larger than the converted flow rate F1, and the converted flow rate F1 and the converted flow rate F4 are each within a matching range, and it can be seen that the raw material supply control processing by the flow rate control unit 17 is appropriately executed.

The mist flow rate calculation unit 16 in the mist flow rate measuring apparatus of the first embodiment executes the mist flow rate calculation processing based on the imaging information S5 indicating the plurality of luminance values in the plurality of pixels corresponding to the imaging target region R5.

Because there is a certain correlation between the mist flow rate MF (the flow rate of the raw material mist 3) and the plurality of luminance values, the correlation parameter K1 for deriving the mist flow rate MF from the plurality of luminance values indicated by the imaging information S5 can be acquired in advance (see FIG. 5).

As a result, the mist flow rate measuring apparatus of the first embodiment can accurately obtain the mist flow rate MF by executing the mist flow rate calculation processing using the correlation parameter K1 based on the imaging information S5.

The camera 5, which is the mist imaging camera, can relatively easily obtain the imaging information S5 by executing the imaging processing of imaging the reflected light L2.

The mist flow rate calculation unit 16 can execute the mist flow rate calculation processing that is simple and highly accurate by guiding the mist flow rate MF from the luminance sum value.

The mist flow rate measuring apparatus of the first embodiment can execute the imaging processing by the camera 5 in a space in which the diffusion of the raw material mist 3 contained in the mist-containing gas G3 is suppressed, by providing the transparent pipe 10 serving as the imaging pipe having the flow path of the mist-containing gas G3 therein.

In addition, because the constituent material of the transparent pipe 10 has transparency, the presence of the transparent pipe 10 does not affect the imaging processing by the camera 5.

Because the transparent pipe 10 serving as the imaging pipe is disposed along the vertical direction (Z direction), the liquid condensed in the transparent pipe 10 can be discharged downward (−Z direction) in the vertical direction with respect to the transparent pipe 10 without being accumulated in the transparent pipe 10.

Therefore, the mist flow rate measuring apparatus of the first embodiment can execute the imaging processing by the camera 5 while minimizing the influence of the dew condensation in the transparent pipe 10.

On the other hand, in the case where the transparent pipe 10 is disposed in the horizontal direction, the liquid formed by condensation of the raw material mist 3 in the transparent pipe 10 accumulates in the lower side of the transparent pipe 10. In the mist flow rate measuring apparatus of the first embodiment, because the transparent pipe 10 is disposed along the vertical direction, the above-described phenomenon does not occur.

Because the constituent material of the pipe inner surface S10 of the transparent pipe 10 has hydrophilicity, even if the dew condensation occurs in the transparent pipe 10, it is possible to suppress a phenomenon in which the condensed liquid adheres to the pipe inner surface S10 of the transparent pipe 10 as a water droplet.

The flow rate control unit 17 (raw material supply control unit) in the ultrasonic atomization system 1001 of the first embodiment executes the raw material supply control processing based on the mist flow rate information S16 obtained from the mist flow rate calculation unit 16 to make the mist flow rate MF become a predetermined flow rate.

Therefore, the ultrasonic atomization system 1001 of the first embodiment can stabilize the mist flow rate MF generated from the ultrasonic atomization apparatus 100 at the predetermined flow rate over a long period of time.

In step ST5 (see FIG. 6) in the mist flow rate measuring method executed by the mist flow rate measuring apparatus of the first embodiment, the mist flow rate MF is obtained using the correlation parameter K1 based on the plurality of luminance values in the plurality of pixels corresponding to the imaging target region R5.

Because the mist flow rate MF and the plurality of luminance values have a certain correlation, the mist flow rate measuring method of the first embodiment can accurately obtain the mist flow rate MF by using the correlation parameter K1.

(Modification)

In the mist flow rate measuring apparatus of the first embodiment shown in FIGS. 1 to 7, the case of executing the imaging processing once by the camera 5 has been shown. However, a modification is possible in which the imaging processing by the camera 5 is executed a plurality of times in succession.

For example, in the case where the camera 5 has ability of executing the imaging processing at a rate of once every one second, the imaging processing can be performed 20 times by continuously operating the camera 5 for 20 seconds.

FIG. 8 is a flowchart showing the imaging processing and the mist flow rate calculation processing according to the modification of the mist flow rate measuring apparatus of the first embodiment.

In the drawing, processing of steps ST41 to ST44 corresponds to the processing of step ST4 in FIG. 6, and processing of step ST50 corresponds to the processing of step ST5 in FIG. 6. Note that the control shown in steps ST41 to ST44 in FIG. 8 is possibly executed, for example, under the control of the mist flow rate calculation unit 16 or by a control mechanism such as a CPU built in the camera 5. Furthermore, the example shown in FIG. 8 shows a case where the imaging processing is executed for K (≥2) times.

Referring to FIG. 8, in step ST41, a control parameter value i is initially set to {i=1}.

Then, in step ST42, first imaging processing by the camera 5 is executed, and the obtained imaging information S5 is acquired as first imaging information.

Thereafter, in step ST43, it is verified whether or not {i=K} holds for the control parameter value i. Here, if {i=K} (YES), the processing proceeds to step ST50, and if {i=K} is not satisfied (NO), the processing proceeds to step ST44.

In step ST44, the control parameter value i is increased by "1" {i=i+1}, and the processing returns to step ST42. Thereafter, the processing of steps ST42 to ST44 is repeated until it is determined as "YES" in step ST43.

When step ST43 is "YES", it means that the first to K-th imaging information (a plurality of pieces of imaging information) is obtained by executing the imaging processing K times (a plurality of times). Note that a mode can be used in which the camera 5 itself has a function of temporarily storing the first to K-th imaging information, or the mist flow rate calculation unit 16 is provided with the function.

In step ST50 executed when step ST43 is YES, the mist flow rate calculation unit 16 first executes the mist flow rate calculation processing based on the first to K-th imaging information. The first to K-th imaging information is a plurality of pieces of imaging information obtained by executing the imaging processing a plurality of times. Hereinafter, details of step ST50 are described.

First, the mist flow rate calculation unit 16 executes the sum value calculation processing on each of the first to K-th imaging information to obtain first to K-th luminance sum values LS(1) to LS(K) (a plurality of luminance sum values).

Subsequently, the mist flow rate calculation unit 16 obtains an average value of the luminance sum values LS(1) to LS(K) as a sum average value, and obtains the mist flow rate MF from the sum average value using the correlation parameter K1.

For example, assuming that the sum average value is MS, the mist flow rate MF can be obtained by the following Expression (1B) to which Expression (1) described above is applied.

$$MF=K1 \cdot MS+c1 \tag{1B}$$

As described above, in the flow rate derivation processing of the mist flow rate calculation unit 16, the mist flow rate MF is derived from the first to K-th luminance sum values LS(1) to LS(K). In the case of calculating the correlation parameter K1 in the modification, similarly to the actual operation of the mist flow rate measuring apparatus of the modification, it is desirable to calculate the correlation parameter K1 along the flow shown in FIG. 5 from the average value of the first to K-th luminance sum values LS(1) to LS(K).

In the modification of the first embodiment, by deriving the mist flow rate MF from the sum average value MS of the first to K-th luminance sum values LS(1) to LS(K), which are the plurality of luminance sum values, a more accurate mist flow rate MF can be obtained.

Second Embodiment

Figure 9:
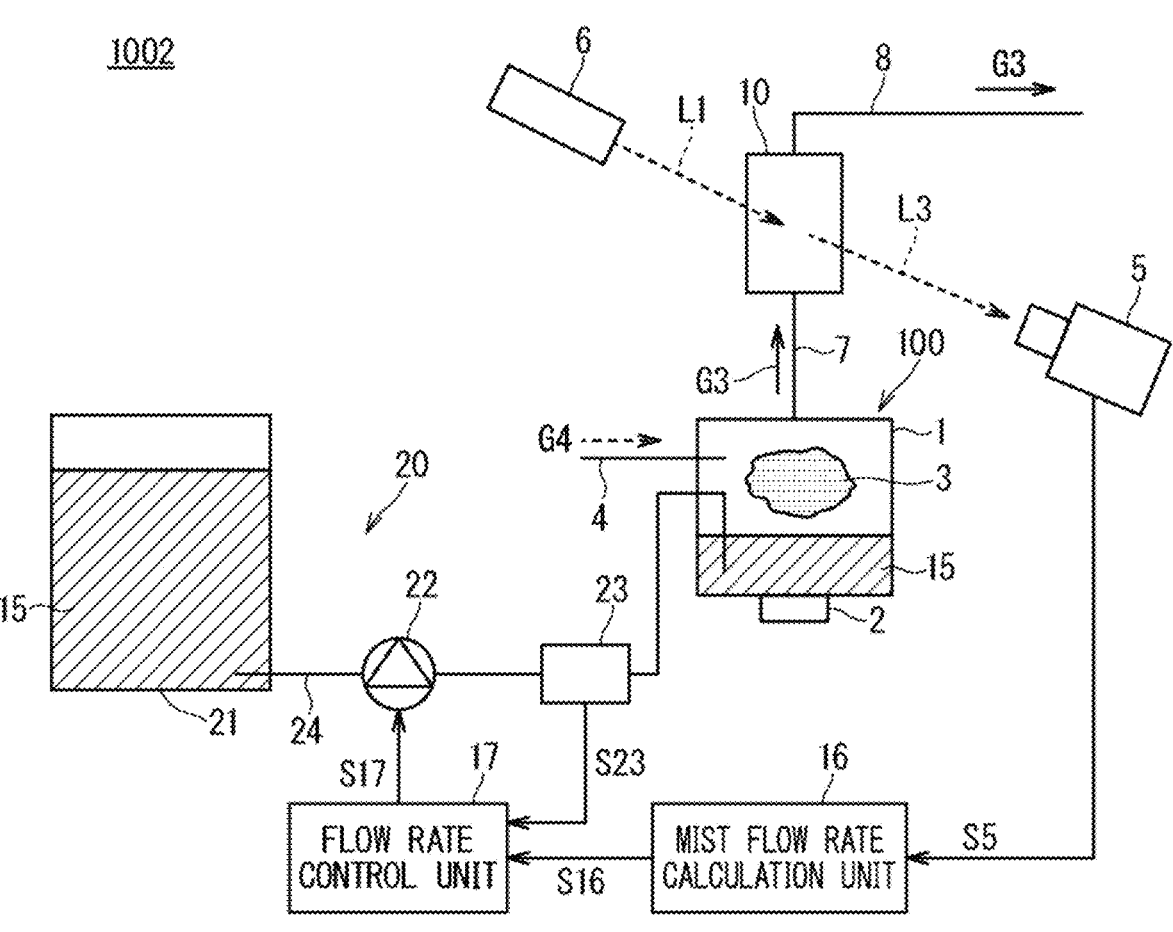
FIG. 9 is an explanatory view showing a configuration of an ultrasonic atomization system according to a second embodiment of the present disclosure.

FIG. 9 is an explanatory view showing a configuration of an ultrasonic atomization system 1002 according to a second embodiment of the present disclosure. The ultrasonic atomization system 1002 includes a mist flow rate measuring apparatus of the second embodiment. The mist flow rate measuring apparatus of the second embodiment includes a camera 5, a light source 6, a transparent pipe 10, and a mist flow rate calculation unit 16 as main constituent elements.

Hereinafter, the same constituent elements as those of the first embodiment are denoted by the same reference numerals to appropriately omit the description thereof, and feature portions of the second embodiment are mainly described.

As shown in FIG. 9, the ultrasonic atomization system 1002 includes, in addition to the mist flow rate measuring apparatus described above, an ultrasonic atomization apparatus 100, a raw material solution supply unit 20, a flow rate control unit 17, an upstream pipe 7, and a downstream pipe 8 as main constituent elements. The upstream pipe 7 and the downstream pipe 8 serve as auxiliary members of the mist flow rate measuring apparatus for providing the transparent pipe 10.

As shown in FIG. 9, in the mist flow rate measuring apparatus of the second embodiment, a part of the mist flowing region in the transparent pipe 10, which is the imaging pipe, is the imaging target region of the camera 5 which is the mist imaging camera.

The light source 6 irradiates the imaging target region in the transparent pipe 10 with incident light L1. Then, the incident light L1 is transmitted through the imaging target region of a mist-containing gas G3, and transmitted light L3 is obtained.

The camera 5, which is the mist imaging camera, is arranged at a position facing the light source 6 with the transparent pipe 10 interposed therebetween, and executes the imaging processing of imaging the transmitted light L3. That is, the imaging processing by the camera 5 is imaging processing on the transmitted light L3, the processing having at least a part of the mist flowing region where the mist-containing gas G3 including a raw material mist 3 flows set as the imaging target region.

The camera 5 executes the imaging processing to acquire imaging information S5. The imaging information S5 includes a plurality of luminance values in a plurality of pixels corresponding to the imaging target region.

The mist flow rate calculation unit 16 in the mist flow rate measuring apparatus of the second embodiment executes the mist flow rate calculation processing based on the imaging information S5 indicating the plurality of luminance values obtained by the imaging processing on the transmitted light L3 by the camera 5.

As a result, similarly to the first embodiment, the mist flow rate measuring apparatus of the second embodiment can accurately obtain a mist flow rate MF by executing the mist flow rate calculation processing using a correlation parameter K1 based on the imaging information S5.

In addition, the camera 5, which is the mist imaging camera of the mist flow rate measuring apparatus of the second embodiment, can relatively easily obtain the imaging information S5 by executing the imaging processing of imaging the transmitted light L3.

Third Embodiment

Figure 10:
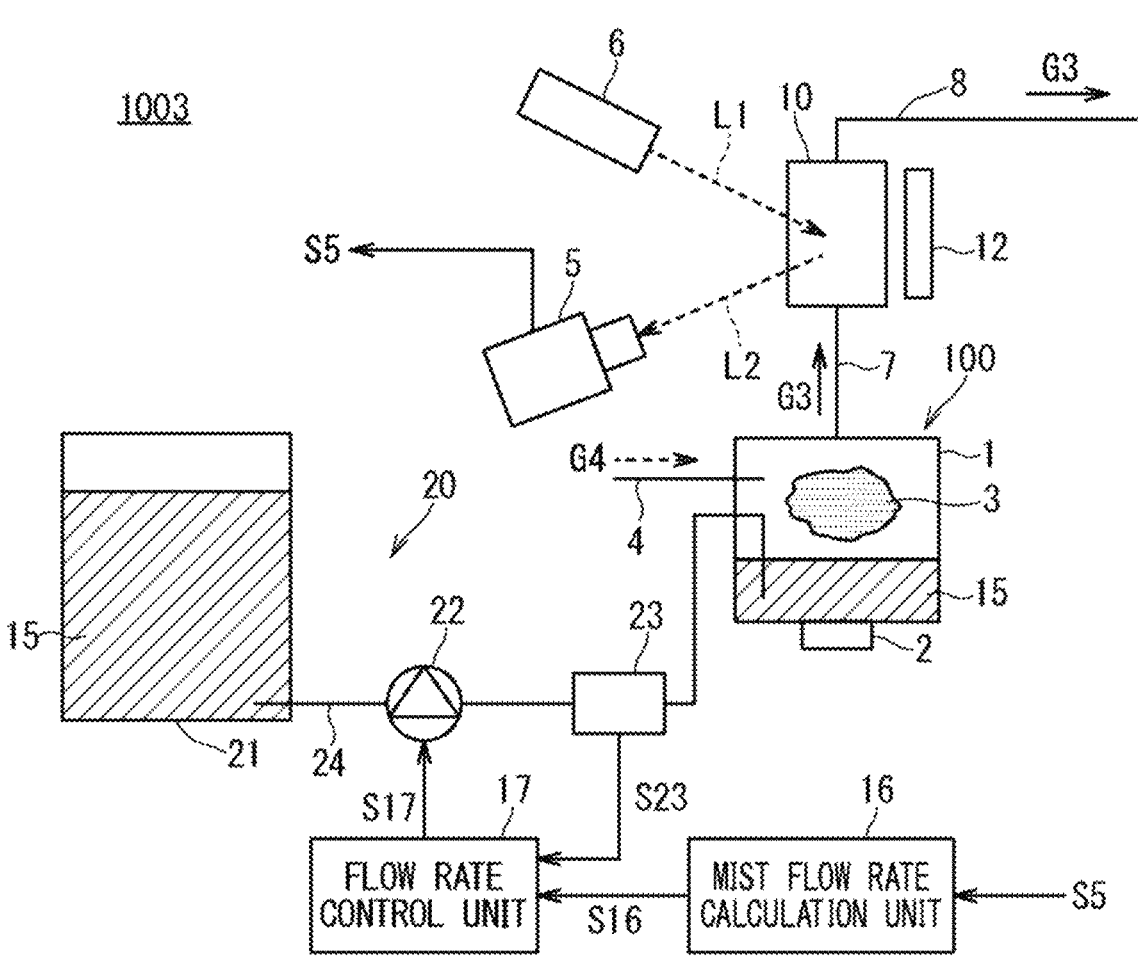
FIG. 10 is an explanatory view showing a configuration of an ultrasonic atomization system according to a third embodiment of the present disclosure.

FIG. 10 is an explanatory view showing a configuration of an ultrasonic atomization system 1003 according to a third embodiment of the present disclosure. The ultrasonic atomization system 1003 includes a mist flow rate measuring apparatus of the third embodiment. The mist flow rate measuring apparatus of the third embodiment includes a camera 5, a light source 6, a transparent pipe 10, a heater 12, and a mist flow rate calculation unit 16 as main constituent elements.

Hereinafter, the same constituent elements as those of the first embodiment are denoted by the same reference numerals to appropriately omit the description thereof, and feature portions of the third embodiment are mainly described.

As shown in FIG. 10, the ultrasonic atomization system 1003 includes, in addition to the mist flow rate measuring apparatus described above, an ultrasonic atomization apparatus 100, a raw material solution supply unit 20, a flow rate control unit 17, an upstream pipe 7, and a downstream pipe 8 as main constituent elements. The upstream pipe 7 and the downstream pipe 8 serve as auxiliary members of the mist flow rate measuring apparatus for providing the transparent pipe 10.

As shown in FIG. 10, in the mist flow rate measuring apparatus of the third embodiment, the heater 12 is provided along the extending direction (Z direction) of the transparent pipe 10, which is an imaging pipe, in proximity to the transparent pipe 10. The heater 12 heats the transparent pipe 10 and the inside thereof.

Similarly to the first embodiment, the mist flow rate calculation unit 16 in the mist flow rate measuring apparatus of the third embodiment executes the mist flow rate calculation processing based on imaging information S5 indicating the plurality of luminance values corresponding to the imaging target region.

As a result, similarly to the first embodiment, the mist flow rate measuring apparatus of the third embodiment can accurately obtain a mist flow rate MF by executing the mist flow rate calculation processing using a correlation parameter K1 based on the imaging information S5.

In addition, the mist flow rate measuring apparatus of the third embodiment further includes the heater 12, and because the heater 12 can heat the transparent pipe 10, which is the imaging pipe, and the inside thereof, the generation of dew condensation in the transparent pipe 10 can be suppressed.

Fourth Embodiment

Figure 11:
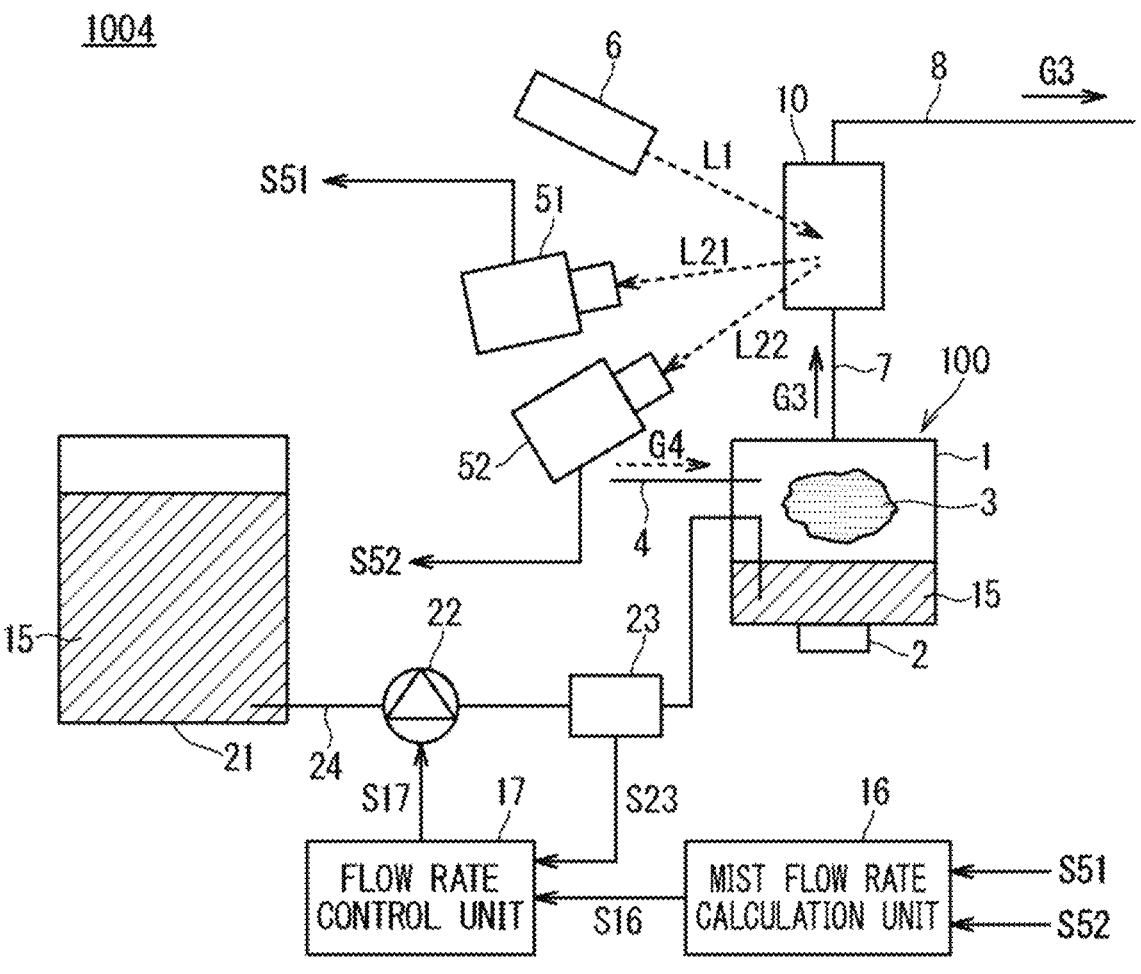
FIG. 11 is an explanatory view showing a configuration of an ultrasonic atomization system according to a fourth embodiment of the present disclosure.

FIG. 11 is an explanatory view showing a configuration of an ultrasonic atomization system 1004 according to a fourth embodiment of the present disclosure. The ultrasonic atomization system 1004 includes a mist flow rate measuring apparatus of the fourth embodiment. The mist flow rate measuring apparatus of the fourth embodiment includes a light source 6, a transparent pipe 10, and a mist flow rate calculation unit 16, and cameras 51 and 52 as main constituent elements.

Hereinafter, the same constituent elements as those of the first embodiment are denoted by the same reference numerals to appropriately omit the description thereof, and feature portions of the fourth embodiment are mainly described.

As shown in FIG. 11, the ultrasonic atomization system 1004 includes, in addition to the mist flow rate measuring apparatus described above, an ultrasonic atomization apparatus 100, a raw material solution supply unit 20, a flow rate control unit 17, an upstream pipe 7, and a downstream pipe 8 as main constituent elements. The upstream pipe 7 and the downstream pipe 8 serve as auxiliary members of the mist flow rate measuring apparatus for providing the transparent pipe 10.

In the mist flow rate measuring apparatus of the fourth embodiment, a part of the mist flowing region in the transparent pipe 10, which is the imaging pipe, is the imaging target region of the cameras 51 and 52, which is the mist imaging camera.

The light source 6 irradiates the imaging target region in the transparent pipe 10 with incident light L1. Then, the incident light L1 is reflected in the imaging target region of a mist-containing gas G3, and two beams of reflected light L21 and L22 (a plurality of the beams of reflected light) are obtained. The beams of reflected light L21 and L22 are reflected in different directions, and do not interfere with each other.

The cameras 51 and 52, which are a plurality of the mist imaging cameras, are arranged with respect to the beams of reflected light L21 and L22, which are a plurality of the beams of reflected light. The camera 51 executes the imaging processing of imaging the reflected light L21, and the camera 52 executes the imaging processing of imaging the reflected light L22.

As described above, the imaging processing by the cameras 51 and 52 is imaging processing on the beams of reflected light L21 and L22, the processing having at least a part of the mist flowing region where the mist-containing gas G3 including a raw material mist 3 flows set as the imaging target region.

The camera 51 executes the imaging processing on the reflected light L21 to acquire imaging information S51. The imaging information S51 indicates a plurality of luminance values in a plurality of pixels corresponding to the reflected light L21 from the imaging target region. The camera 52 executes the imaging processing on the reflected light L22 to acquire imaging information S52. The imaging information S52 indicates a plurality of luminance values in a plurality of pixels corresponding to the reflected light L22 from the imaging target region.

The beams of reflected light L21 and L22 do not interfere with each other, and the pieces of imaging information S51 and S52 as a plurality of types of imaging information indicate a plurality of luminance values having different contents.

The mist flow rate calculation unit 16 executes the mist flow rate calculation processing of obtaining the flow rate of the raw material mist 3 in the mist-containing gas G3 based on the pieces of imaging information S51 and S52, which are the plurality of types of imaging information, and obtains mist flow rate information S16 indicating the flow rate of the raw material mist 3.

The mist flow rate calculation processing includes the sum value calculation processing and the flow rate derivation processing described below.

Sum value calculation processing . . . Processing of obtaining a first luminance sum value which is a sum of the plurality of luminance values indicated by the imaging information S51 and a second luminance sum value which is a sum of the plurality of luminance values indicated by the imaging information S52, and obtaining an average value of the first and second luminance sum values as a luminance sum average value Flow rate derivation processing . . . Processing of deriving the flow rate of the raw material mist 3 from the luminance sum average value obtained by the sum value calculation processing For example, when the luminance sum average value obtained by the sum value calculation processing is denoted by LM, a mist flow rate MF can be obtained by a following Expression (1C) to which Expression (1) described above is applied.

$$MF = K1 \cdot LM + c1 \tag{1C}$$

As described above, the mist flow rate calculation unit 16 executes the mist flow rate calculation processing based on the plurality of luminance values respectively indicated by the pieces of imaging information S51 and S52. In the case of calculating a correlation parameter K1 in the fourth embodiment, similarly to the actual operation of the mist flow rate measuring apparatus of the fourth embodiment, it is desirable to calculate the correlation parameter K1 along the flow shown in FIG. 5 from the average value of the first and second luminance sum values.

The mist flow rate calculation unit 16 in the mist flow rate measuring apparatus of the fourth embodiment executes the mist flow rate calculation processing based on the pieces of imaging information S51 and S52 each indicating the plurality of luminance values.

As a result, similarly to the first embodiment, the mist flow rate measuring apparatus of the fourth embodiment can accurately obtain the mist flow rate MF by executing the mist flow rate calculation processing using the correlation parameter K1 based on the pieces of imaging information S51 and S52.

The mist flow rate calculation unit 16 executes the mist flow rate calculation processing based on the various pieces of imaging information S51 and S52 (plurality of types of imaging information) obtained from the cameras 51 and 52 which are the plurality of mist imaging cameras.

Therefore, the mist flow rate measuring apparatus of the fourth embodiment can more accurately obtain the flow rate of the raw material mist 3.

Although the mist flow rate calculation unit 16 of the fourth embodiment obtains the average value of the first and second luminance sum values is obtained when executing the sum value calculation processing, weighting may be performed between the first and second luminance sum values to make one ratio higher than the other ratio. For example, the ratio between the first luminance sum value and the second luminance sum value may be set to {2:1}.

In the fourth embodiment shown in FIG. 11, the configuration in which one light source 6 is provided has been described, but the number of the light sources 6 may be two so as to match the number of the cameras 51 and 52.

In addition, in the fourth embodiment, the two cameras 51 and 52 are shown as the plurality of mist imaging cameras, but three or more types of imaging information may be obtained using three or more mist imaging cameras.

Fifth Embodiment

FIG. 12 is an explanatory view showing a configuration of an ultrasonic atomization system 1005 according to a fifth embodiment of the present disclosure. The ultrasonic atomization system 1005 includes a mist flow rate measuring apparatus of the fifth embodiment. The mist flow rate measuring apparatus of the fifth embodiment includes a camera 5, a light source 6, an upstream pipe 7, a downstream pipe 8, a pipe absent space 9, and a mist flow rate calculation unit 16 as main constituent elements.

Hereinafter, the same constituent elements as those of the first embodiment are denoted by the same reference numerals to appropriately omit the description thereof, and feature portions of the fifth embodiment are mainly described.

As shown in FIG. 12, the ultrasonic atomization system 1005 includes, in addition to the mist flow rate measuring apparatus described above, an ultrasonic atomization apparatus 100, a raw material solution supply unit 20, a flow rate control unit 17, an upstream pipe 7, and a downstream pipe 8 as main constituent elements.

The upstream pipe 7 and the downstream pipe 8 are disposed spaced apart from each other with the pipe absent space 9 interposed therebetween, and the combination of the upstream pipe 7 and the downstream pipe 8 constitutes an external discharge pipe for a mist-containing gas G3. The upstream pipe 7 serves as a first gas supply pipe, the downstream pipe 8 serves as a second gas supply pipe, and the pipe absent space 9 serves as a gap space.

In the fifth embodiment, the upstream pipe 7 (first gas supply pipe) and the downstream pipe 8 (second gas supply pipe) also function as main constituent elements essential for providing the pipe absent space 9 in the mist flow rate measuring apparatus.

As described above, a mist-containing gas G3 containing a raw material mist 3 is supplied to the outside from an atomization container 1 via the upstream pipe 7, the pipe absent space 9, and the downstream pipe 8.

Figure 13:
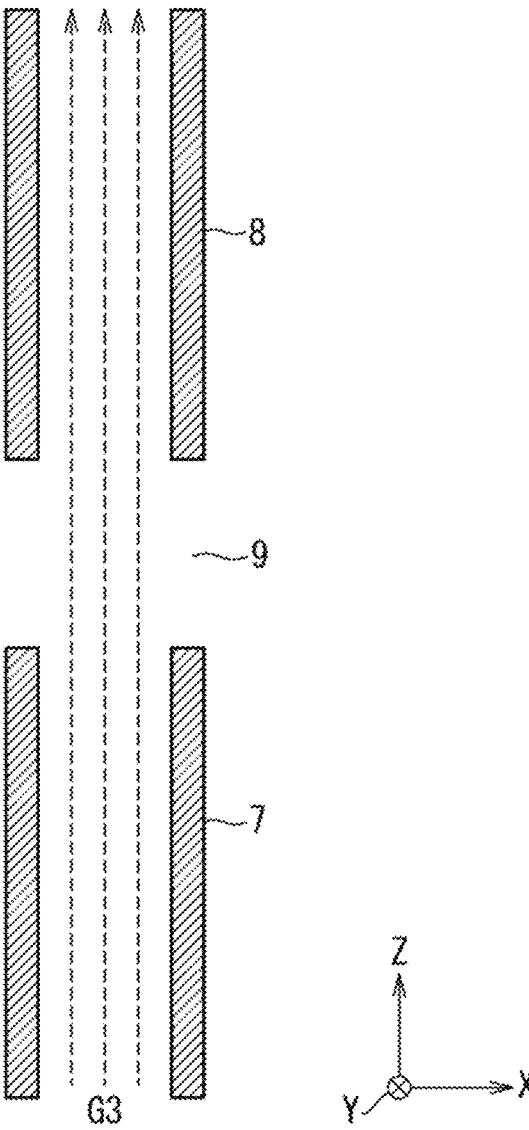
FIG. 13 is an explanatory view showing a cross-sectional structure of an upstream pipe and a downstream pipe shown in FIG. 12.

FIG. 13 is an explanatory view showing a cross-sectional structure of the upstream pipe 7 and the downstream pipe 8. In FIG. 13, an XYZ orthogonal coordinate system is shown.

As shown in FIG. 13, each of the upstream pipe 7 and the downstream pipe 8 serves as a flow path of the mist-containing gas G3 in the inside thereof. That is, each of the upstream pipe 7 and the downstream pipe 8 has the mist flowing region therein. Further, a pipe absent space 9 exists as the gap space between the upstream pipe 7 and the downstream pipe 8. The pipe absent space 9 also serves as the flow path of the mist-containing gas G3. That is, the pipe absent space 9 has the mist flowing region therein.

As shown in FIG. 13, the upstream pipe 7 and the downstream pipe 8 are disposed along the extending direction (+Z direction).

Because the mist-containing gas G3 is conveyed by a carrier gas G4 at a constant flow rate, the mist-containing gas G3 flowing from the upstream pipe 7 to the pipe absent space 9 flows into the downstream pipe 8 along the +Z direction without leaking to the outside from the pipe absent space 9.

In the mist flow rate measuring apparatus of the fifth embodiment, a part of the mist flowing region in the pipe absent space 9, which is the gap space, is the imaging target region of the camera 5 which is the mist imaging camera.

The light source 6 irradiates the imaging target region in the pipe absent space 9 with incident light L1. Then, the incident light L1 is reflected in the imaging target region of the mist-containing gas G3, and reflected light L2 is obtained.

Then, the camera 5, which is the mist imaging camera, executes imaging processing of imaging the reflected light L2.

The camera 5 executes the imaging processing to acquire imaging information S5. The imaging information S5 indicates a plurality of luminance values in a plurality of pixels corresponding to the imaging target region in the pipe absent space 9.

Similarly to the first embodiment, the mist flow rate calculation unit 16 in the mist flow rate measuring apparatus of the fifth embodiment executes the mist flow rate calculation processing based on the imaging information S5 indicating the plurality of luminance values.

As a result, similarly to the first embodiment, the mist flow rate measuring apparatus of the fifth embodiment can accurately obtain a mist flow rate MF by executing the mist flow rate calculation processing using a correlation parameter K1 based on the imaging information S5.

Because the imaging target region of the camera 5, which is the mist imaging camera, exists in the pipe absent space 9, which is the gap space, the camera 5 in the mist flow rate measuring apparatus of the fifth embodiment can accurately execute the imaging processing on the reflected light L2 without being affected by dew condensation at all.

Problems of Transparent Pipes 10 of First to Fourth Embodiments

As shown in FIG. 4, the inner diameter of the transparent pipe 10, which is the imaging pipe used in the mist flow rate measuring apparatuses of the first to fourth embodiments, is set to the same length as the inner diameter of each of the upstream pipe 7 and the downstream pipe 8. Therefore, when the dew condensation of the mist-containing gas G3 occurs in the transparent pipe 10, there is a possibility that the condensed liquid (water droplet) adheres to the pipe inner surface S10.

The phenomenon that the liquid adheres to the pipe inner surface S10 of the transparent pipe 10 affects the imaging processing by the camera 5, which is the mist imaging camera, and thus becomes an inhibition factor in the imaging processing that the imaging information S5 (S51, S52) cannot be obtained with high accuracy.

Imaging pipes and the peripheral structures thereof described in sixth to tenth embodiments are intended to improve the above-described inhibition factor in the imaging processing.

Sixth Embodiment

Figure 14:
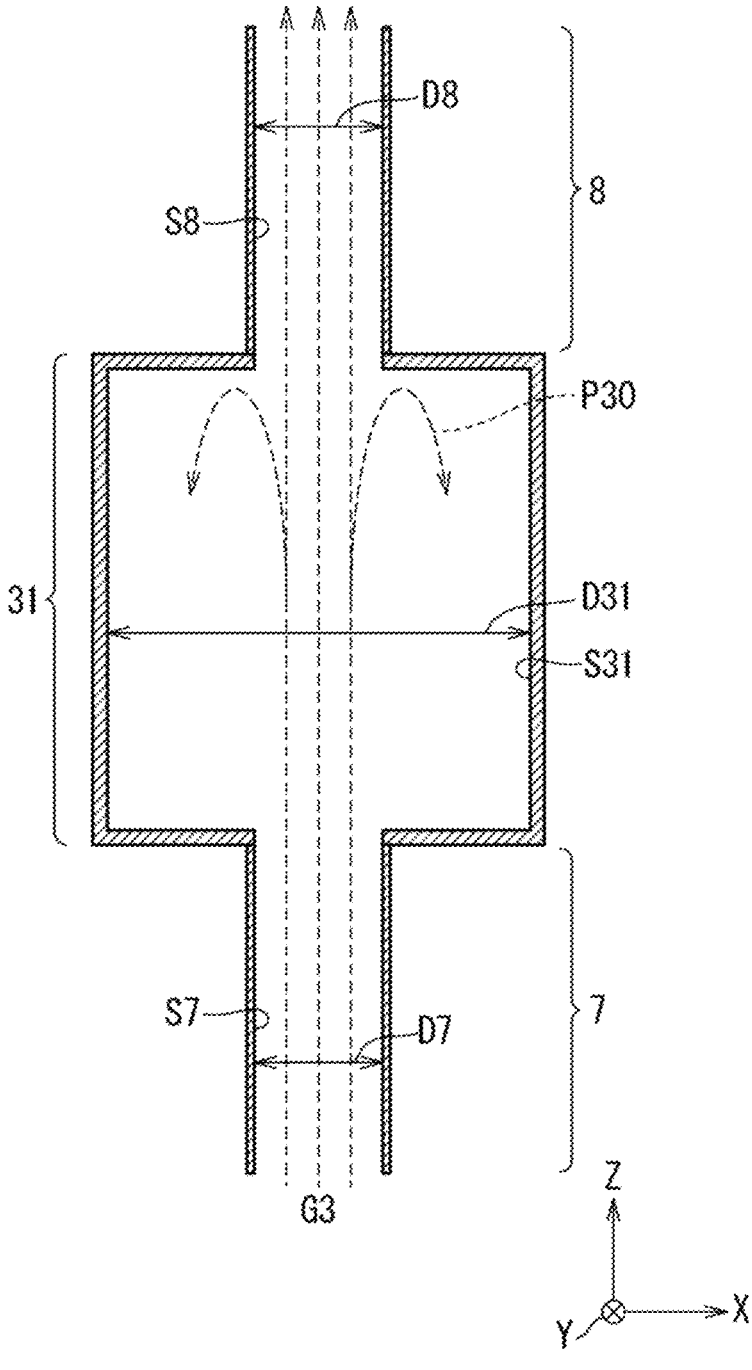
FIG. 14 is an explanatory view showing cross-sectional structures of an upstream pipe, a large-diameter transparent pipe, and a downstream pipe in a mist flow rate measuring apparatus of a sixth embodiment.
Figure 15:
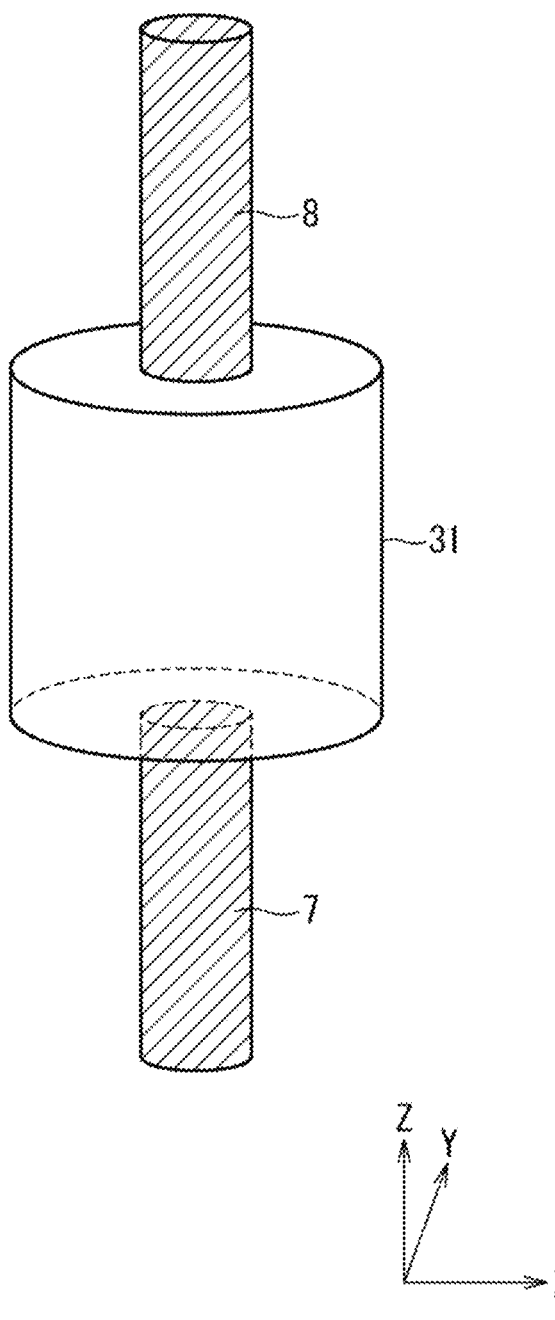
FIG. 15 is a perspective view showing the large-diameter transparent pipe shown in FIG. 14 and the entire peripheral structure thereof.

FIG. 14 is an explanatory view showing cross-sectional structures of an upstream pipe 7, a large-diameter transparent pipe 31, and a downstream pipe 8 in a mist flow rate measuring apparatus of a sixth embodiment. FIG. 15 is a perspective view showing an entire structure of the upstream pipe 7, the large-diameter transparent pipe 31, and the downstream pipe 8. In each of FIGS. 14 and 15, an XYZ orthogonal coordinate system is shown.

In the mist flow rate measuring apparatus of the sixth embodiment, the configuration other than an external discharge pipe including the upstream pipe 7, the large-diameter transparent pipe 31, and the downstream pipe 8 is the same as the configuration of the mist flow rate measuring apparatus of the first embodiment shown in FIGS. 1 to 8. However, in the sixth embodiment, the upstream pipe 7 and the downstream pipe 8 are included in the main constituent elements of the mist flow rate measuring apparatus together with the large-diameter transparent pipe 31.

A mist flow rate measuring apparatus of the sixth embodiment is different from that of the first embodiment in that the transparent pipe 10 serving as an imaging pipe shown in FIG. 1 is replaced with the large-diameter transparent pipe 31.

In the sixth embodiment, the external discharge pipe is constituted of a combination of the upstream pipe 7, the large-diameter transparent pipe 31, and the downstream pipe 8. The upstream pipe 7 serves as the first gas supply pipe, the downstream pipe 8 serves as the second gas supply pipe, and the large-diameter transparent pipe 31 serves as the imaging pipe.

In addition, the configuration of the ultrasonic atomization system excluding the mist flow rate measuring apparatus is similar to the configuration of the ultrasonic atomization system 1001 of the first embodiment shown in FIG. 1.

As shown in FIGS. 14 and 15, the upstream pipe 7, the large-diameter transparent pipe 31, and the downstream pipe 8 constituting the external discharge pipe are each disposed along the Z direction parallel to the vertical direction, and the upstream pipe 7 and the large-diameter transparent pipe 31, and the large-diameter transparent pipe 31 and the downstream pipe 8, are respectively directly coupled to each other. The upstream pipe 7, the large-diameter transparent pipe 31, and the downstream pipe 8 may be integrally formed.

Therefore, a mist-containing gas G3 supplied from an ultrasonic atomization apparatus 100 (see FIG. 1) flows inside each of the upstream pipe 7, the large-diameter transparent pipe 31, and the downstream pipe 8 along a predetermined direction, that is, the counter-vertical direction (+Z direction). Here, the counter-vertical direction is a direction diametrically opposite to the vertical direction.

As described above, a flow path of the mist-containing gas G3 is provided in each of the upstream pipe 7, the large-diameter transparent pipe 31, and the downstream pipe 8. That is, each of the upstream pipe 7, the large-diameter transparent pipe 31, and the downstream pipe 8 has the mist flowing region therein.

In addition, the cross-sectional shape of each of the upstream pipe 7, the large-diameter transparent pipe 31, and the downstream pipe 8 is a circular shape having a constant inner diameter. The upstream pipe 7 has an inner diameter D7, the large-diameter transparent pipe 31 has an inner diameter D31, and the downstream pipe 8 has an inner diameter D8. In the sixth embodiment, the entire large-diameter transparent pipe 31 has a constant inner diameter region with the inner diameter D31. The upstream pipe 7, the large-diameter transparent pipe 31, and the downstream pipe 8 each have a predetermined length along the Z direction.

A constituent material of the large-diameter transparent pipe 31, which is the imaging pipe has transparency. Further, a constituent material of a pipe inner surface S31 of the large-diameter transparent pipe 31 has hydrophilicity. In the sixth embodiment, the pipe inner surface S31 of the large-diameter transparent pipe 31 is an inner surface of the constant inner diameter region.

It is desirable that constituent materials of a pipe inner surface S7 of the upstream pipe 7 and a pipe inner surface S8 of the downstream pipe 8 also have hydrophilicity. On the other hand, because the upstream pipe 7 and the downstream pipe 8 are not imaging pipes, these pipes do not need to have transparency. In addition, the thickness of each of the upstream pipe 7, the large-diameter transparent pipe 31, and the downstream pipe 8 is optionally set.

In the mist flow rate measuring apparatus of the sixth embodiment, a part of the mist flowing region in the large-diameter transparent pipe 31, which is the imaging pipe, is the imaging target region of a camera 5, which is the mist imaging camera.

In FIG. 15, a white portion indicates a transparent portion, and a diagonal hatched portion indicates a non-transparent portion. As shown in FIG. 15, the external discharge pipe of the sixth embodiment includes the large-diameter transparent pipe 31 having transparency, and the upstream pipe 7 and the downstream pipe 8 not having transparency.

Regarding the external discharge pipe of the sixth embodiment, the inner diameter D7 of the upstream pipe 7 as the first gas supply pipe and the inner diameter D8 of the downstream pipe 8 as the second gas supply pipe are set to the same value. Meanwhile, the inner diameter D31 of the large-diameter transparent pipe 31, the entire of which is the constant inner diameter region, is set to a value larger than the inner diameters D7 and D8. That is, the large-diameter transparent pipe 31, the upstream pipe 7, and the downstream pipe 8 have a magnitude relationship with respect to the inner diameter of $\{D31>D7=D8\}$. Note that the upstream pipe 7, the large-diameter transparent pipe 31, and the downstream pipe 8 have central positions that match with each other in plan view.

Regarding the external discharge pipe of the mist flow rate measuring apparatus of the sixth embodiment, the inner diameter D31 of the large-diameter transparent pipe 31 (constant inner diameter region), which is the imaging pipe, is larger than the inner diameters D7 and D8 of the upstream pipe 7 and the downstream pipe 8 serving as the first and second gas supply pipes.

Therefore, an inner surface difference distance $\Delta 11$ ($=(D31-D7)/2$) is generated between the pipe inner surface S31 of the large-diameter transparent pipe 31 and the pipe inner surface S7 of the upstream pipe 7. Similarly, an inner surface difference distance $\Delta 12$ ($=(D31-D8)/2$) is generated between the pipe inner surface S31 of the large-diameter transparent pipe 31 and the pipe inner surface S8 of the downstream pipe 8. The inner surface difference distance $\Delta 11$ is a first inner surface difference distance, and the inner surface difference distance $\Delta 12$ is a second inner surface difference distance.

When the mist-containing gas G3 is propagated from the upstream pipe 7 to the large-diameter transparent pipe 31, the possibility that the mist-containing gas G3 reaches the pipe inner surface S31 of the large-diameter transparent pipe 31 can be reduced by the portion where the inner surface difference distance $\Delta 11$ to be the first inner surface difference distance, is generated.

Meanwhile, when the mist-containing gas G3 is propagated from the large-diameter transparent pipe 31 to the downstream pipe 8, as shown in FIG. 14, there is a possibility of a gas reflecting phenomenon P30 occurring in which a part of the mist-containing gas G3 is reflected from the downstream pipe 8.

However, by the portion where the inner surface difference distance $\Delta 12$, which is the second inner surface difference distance, is generated between the large-diameter transparent pipe 31 and the downstream pipe 8, the possibility that a part of the mist-containing gas G3 reflected from the downstream pipe 8 reaches the pipe inner surface S31 of the large-diameter transparent pipe 31 can be suppressed low.

Therefore, the mist flow rate measuring apparatus of the sixth embodiment including the large-diameter transparent pipe 31 can suppress the occurrence of dew condensation on the pipe inner surface S31 of the large-diameter transparent pipe 31 (constant inner diameter region) and satisfactorily execute the imaging processing by the camera 5, which is the mist imaging camera.

As a result, the mist flow rate measuring apparatus of the sixth embodiment has an effect of being able to accurately measure the flow rate of the raw material mist by improving the above-described inhibition factor in the imaging processing.

Because the large-diameter transparent pipe 31 is disposed along the vertical direction (Z direction), even if the dew condensation occurs in the inner surface of the pipe inner surface S31 of the large-diameter transparent pipe 31, the condensed liquid can be discharged downward in the vertical direction with respect to the large-diameter transparent pipe 31 without being accumulated in the large-diameter transparent pipe 31.

Therefore, the mist flow rate measuring apparatus of the sixth embodiment can execute the imaging processing by the camera 5 while minimizing the influence of the dew condensation in the large-diameter transparent pipe 31.

In addition, in the mist flow rate measuring apparatus of the sixth embodiment, the minimum necessary combination of the upstream pipe 7, the large-diameter transparent pipe 31, and the downstream pipe 8 can constitute the external discharge pipe for the mist-containing gas G3.

In the sixth embodiment, because the entire large-diameter transparent pipe 31 has the constant inner diameter region that is constant at the inner diameter D31, the large-diameter transparent pipe 31 serving as the imaging pipe can be realized with a relatively simple structure.

Further, because the constituent material of the pipe inner surface S31 of the large-diameter transparent pipe 31 has hydrophilicity, even if the dew condensation occurs in the large-diameter transparent pipe 31, it is possible to suppress a phenomenon in which the condensed liquid adheres to the pipe inner surface S31 of the large-diameter transparent pipe 31 as a water droplet.

The inner surface difference distance $\Delta 11$ is desirably set to a length that allows the possibility of the mist-containing gas G3 reaching the pipe inner surface S31 of the large-diameter transparent pipe 31 to be reduced to substantially "zero" when the mist-containing gas G3 is propagated from the upstream pipe 7 to the large-diameter transparent pipe 31.

Further, the inner surface difference distance $\Delta 12$ is desirably set to a length that allows the possibility of the reflected component of the mist-containing gas G3 reaching the pipe inner surface S31 of the large-diameter transparent pipe 31 to be reduced to substantially "zero" even if the gas reflecting phenomenon P30 occurs.

In the sixth embodiment, the configurations of the first embodiment shown in FIGS. 1 to 8 are adopted as the configurations of the mist flow rate measuring apparatus and the ultrasonic atomization system excluding the external discharge pipe. However, the configurations of the second to fourth embodiments shown in FIGS. 9 to 11 may be adopted instead of those of the first embodiment.

Seventh Embodiment

Figure 16:
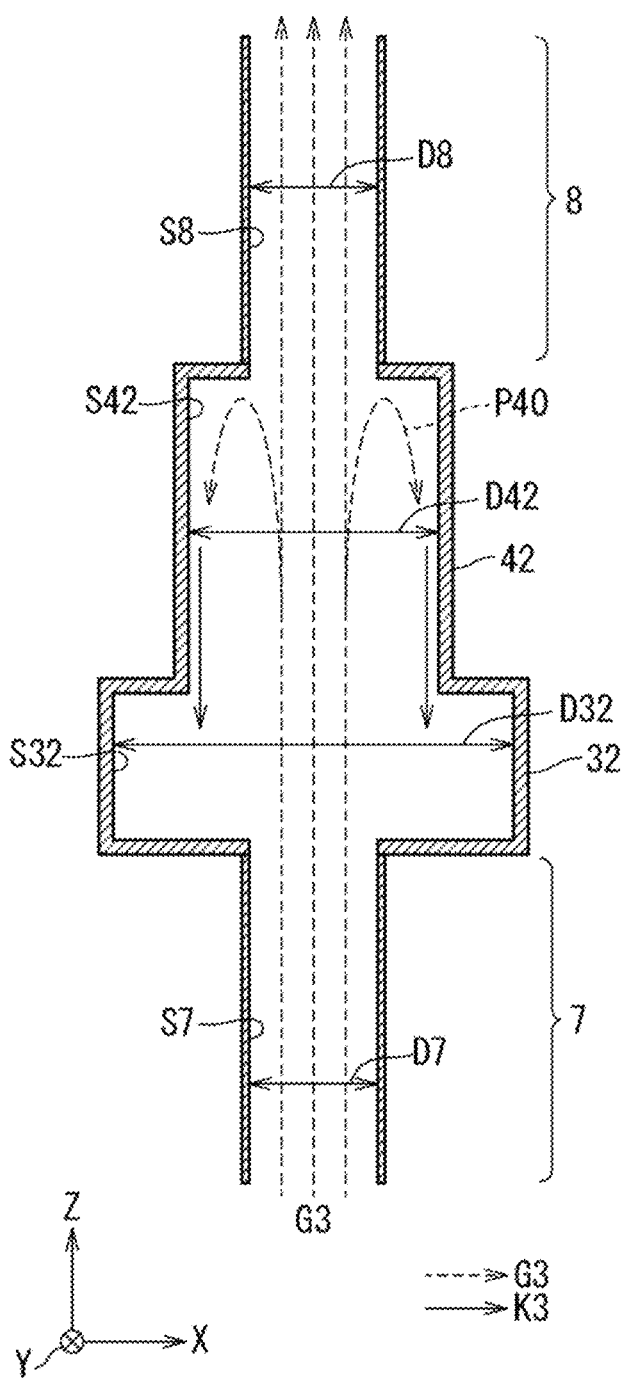
FIG. 16 is an explanatory view showing cross-sectional structures of an upstream pipe, a large-diameter transparent pipe, an intermediate pipe, and a downstream pipe in a mist flow rate measuring apparatus of a seventh embodiment.
Figure 17:
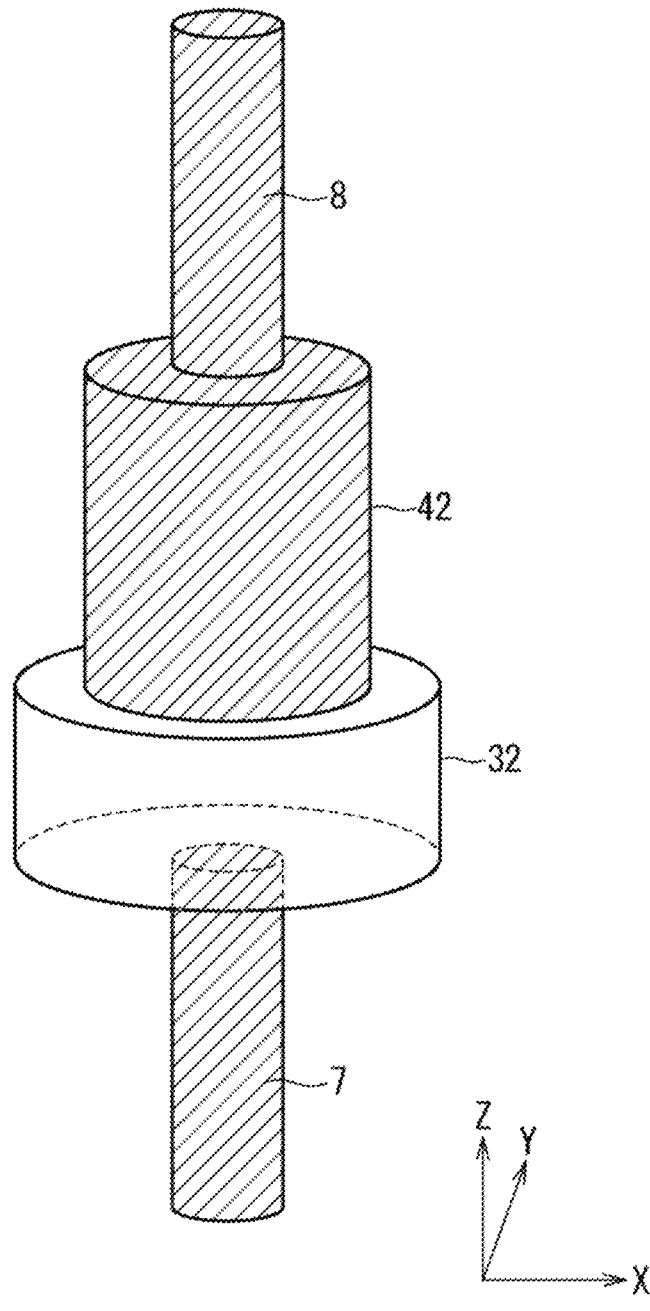
FIG. 17 is a perspective view showing the large-diameter transparent pipe and the intermediate pipe shown in FIG. 16 and the entire peripheral structure thereof.

FIG. 16 is an explanatory view showing cross-sectional structures of an upstream pipe 7, a large-diameter transparent pipe 32, an intermediate pipe 42, and a downstream pipe 8 in a mist flow rate measuring apparatus of a seventh embodiment. FIG. 17 is a perspective view showing an entire structure of the upstream pipe 7, the large-diameter transparent pipe 32, the intermediate pipe 42, and the downstream pipe 8. In each of FIGS. 16 and 17, an XYZ orthogonal coordinate system is shown.

In the mist flow rate measuring apparatus of the seventh embodiment, the configuration other than an external discharge pipe including the upstream pipe 7, the large-diameter transparent pipe 32, the intermediate pipe 42, and the downstream pipe 8 is the same as the configuration of the mist flow rate measuring apparatus of the first embodiment shown in FIGS. 1 to 8. However, the upstream pipe 7, the intermediate pipe 42, and the downstream pipe 8 are included in the main constituent elements of the mist flow rate measuring apparatus together with the large-diameter transparent pipe 32.

A mist flow rate measuring apparatus of the seventh embodiment is different from that of the first embodiment in that the transparent pipe 10 shown in FIG. 1 is replaced with the large-diameter transparent pipe 32 and the intermediate pipe 42.

In seventh embodiment, the external discharge pipe is constituted of a combination of the upstream pipe 7, the large-diameter transparent pipe 32, the intermediate pipe 42, and the downstream pipe 8. The upstream pipe 7 serves as the first gas supply pipe, the downstream pipe 8 serves as the second gas supply pipe, the large-diameter transparent pipe 32 serves as the imaging pipe, and the intermediate pipe 42 serves as a first imaging auxiliary pipe.

In addition, the configuration of the ultrasonic atomization system excluding the mist flow rate measuring apparatus is similar to the configuration of the ultrasonic atomization system 1001 of the first embodiment shown in FIG. 1.

As shown in FIGS. 16 and 17, the upstream pipe 7, the large-diameter transparent pipe 32, the intermediate pipe 42, and the downstream pipe 8 constituting the external discharge pipe are each disposed along the Z direction parallel to the vertical direction, and the upstream pipe 7 and the large-diameter transparent pipe 32, the large-diameter transparent pipe 32 and the intermediate pipe 42, and the intermediate pipe 42 and the downstream pipe 8, are respectively directly coupled to each other. The upstream pipe 7, the large-diameter transparent pipe 32, the intermediate pipe 42, and the downstream pipe 8 may be integrally formed.

Therefore, a mist-containing gas G3 supplied from an ultrasonic atomization apparatus 100 (see FIG. 1) flows through the upstream pipe 7, the large-diameter transparent pipe 32, the intermediate pipe 42, and the downstream pipe 8 in this order along a predetermined direction, that is, the counter-vertical direction (+Z direction).

As described above, a flow path of the mist-containing gas G3 is provided in each of the upstream pipe 7, the large-diameter transparent pipe 32, the intermediate pipe 42, and the downstream pipe 8. That is, each of the upstream pipe 7, the large-diameter transparent pipe 32, the intermediate pipe 42, and the downstream pipe 8 has the mist flowing region therein.

In addition, the cross-sectional shape of each of the upstream pipe 7, the large-diameter transparent pipe 32, the intermediate pipe 42, and the downstream pipe 8 is a circular shape having a constant inner diameter. The upstream pipe 7 has an inner diameter D7, the large-diameter transparent pipe 32 has an inner diameter D32, the intermediate pipe 42 has an inner diameter D42, and the downstream pipe 8 has an inner diameter D8.

In the seventh embodiment, the entire large-diameter transparent pipe 32 has a constant inner diameter region with the inner diameter D32. The large-diameter transparent pipe 32 and the intermediate pipe 42 each have a predetermined length along the Z direction.

A constituent material of the large-diameter transparent pipe 32, which is the imaging pipe, has transparency. Further, a constituent material of a pipe inner surface S32 of the large-diameter transparent pipe 32 has hydrophilicity. In the seventh embodiment, the pipe inner surface S32 of the large-diameter transparent pipe 32 is an inner surface of the constant inner diameter region.

It is desirable that constituent materials of a pipe inner surface S7 of the upstream pipe 7, a pipe inner surface S42 of the intermediate pipe 42, and a pipe inner surface S8 of the downstream pipe 8 also have hydrophilicity. On the other hand, because the upstream pipe 7, the intermediate pipe 42, and the downstream pipe 8 are not imaging pipes, these pipes do not need to have transparency. In addition, the thickness of each of the upstream pipe 7, the large-diameter transparent pipe 32, the intermediate pipe 42, and the downstream pipe 8 is optionally set.

In the mist flow rate measuring apparatus of the seventh embodiment, a part of the mist flowing region in the large-diameter transparent pipe 32, which is the imaging pipe, is the imaging target region of a camera 5, which is the mist imaging camera.

In FIG. 17, a white portion indicates a transparent portion, and a diagonal hatched portion indicates a non-transparent portion. As shown in FIG. 17, the external discharge pipe of the seventh embodiment includes the large-diameter transparent pipe 32 having transparency, and the upstream pipe 7, the intermediate pipe 42, and the downstream pipe 8 not having transparency.

Regarding the external discharge pipe of the seventh embodiment, the inner diameter D7 of the upstream pipe 7 and the inner diameter D8 of the downstream pipe 8 are set to the same value. The inner diameter D42 of the intermediate pipe 42 is set to a value larger than each of the inner diameters D7 and D8. That is, the intermediate pipe 42, the upstream pipe 7, and the downstream pipe 8 have a magnitude relationship with respect to the inner diameter of {D42>D8=D7}.

Meanwhile, the inner diameter D32 of the large-diameter transparent pipe 32, the entire of which is the constant inner diameter region, is set to a value larger than the inner diameter D42. That is, the large-diameter transparent pipe 32 and the intermediate pipe 42 have a magnitude relationship with respect to the inner diameter of {D32>D42 (>D7= D8)}.

Note that the upstream pipe 7, the large-diameter transparent pipe 32, the intermediate pipe 42, and the downstream pipe 8 have central positions that match with each other in plan view.

Regarding the external discharge pipe of the mist flow rate measuring apparatus of the seventh embodiment, the inner diameter D32 of the large-diameter transparent pipe 32 (constant inner diameter region), which is the imaging pipe, is larger than the inner diameters D7 and D8 of the upstream pipe 7 and the downstream pipe 8 serving as the first and second gas supply pipes.

Therefore, similarly to the sixth embodiment, the mist flow rate measuring apparatus of the seventh embodiment can suppress the occurrence of dew condensation on the pipe inner surface S32 of the large-diameter transparent pipe 32 and satisfactorily execute the imaging processing by the camera 5, which is the mist imaging camera.

As a result, similarly to the sixth embodiment, the mist flow rate measuring apparatus of the seventh embodiment has an effect of being able to accurately measure the flow rate of the raw material mist by improving the above-described inhibition factor in the imaging processing.

In the seventh embodiment, because the inner diameter D42 of the intermediate pipe 42, which is the first imaging auxiliary pipe, is smaller than the inner diameter D32 of the large-diameter transparent pipe 32 (constant inner diameter region), an inner surface difference distance Δ13 (=(D32−D42)/2) is generated between the pipe inner surface S42 of the intermediate pipe 42 and the pipe inner surface S32 of the large-diameter transparent pipe 32. Because the inner diameter D42 of the intermediate pipe 42 is larger than the inner diameter D8 of the downstream pipe 8, an inner surface difference distance Δ14 (=(D42−D8)/2) is generated between the pipe inner surface S42 of the intermediate pipe 42 and the pipe inner surface S8 of the downstream pipe 8. The inner surface difference distance Δ13 is a third inner surface difference distance, and the inner surface difference distance Δ14 is a fourth inner surface difference distance.

In the seventh embodiment, when the mist-containing gas G3 is propagated from the intermediate pipe 42 to the downstream pipe 8, as shown in FIG. 16, there is a possibility of a gas reflecting phenomenon P40 occurring in which a part of the mist-containing gas G3 is reflected from the downstream pipe 8. Due to the gas reflecting phenomenon P40, there is a possibility that a condensed liquid adheres to the pipe inner surface S42 of the intermediate pipe 42.

However, because the inner surface difference distance Δ14, which is the fourth inner surface difference distance, is generated between the intermediate pipe 42 and the downstream pipe 8, the possibility that the condensed liquid adheres to the pipe inner surface S42 of the intermediate pipe 42 due to the gas reflecting phenomenon P40 can be suppressed low.

Even if the liquid (water droplet) adheres to the pipe inner surface S42 of the intermediate pipe 42 and a liquid K3 condensed along the pipe inner surface S42 falls by its own weight as shown in FIG. 16, because the inner surface difference distance Δ13, which is the third inner surface difference distance, is generated between the intermediate pipe 42 and the large-diameter transparent pipe 32, the possibility that a part of the liquid that falls by its own weight reaches the pipe inner surface S32 of the large-diameter transparent pipe 32 can be suppressed low.

As a result, the mist flow rate measuring apparatus of the seventh embodiment can effectively suppress the occurrence of dew condensation on the pipe inner surface S32 of the large-diameter transparent pipe 32, which is the imaging pipe, and satisfactorily execute the imaging processing by the camera 5, which is the mist imaging camera.

In the seventh embodiment, because the entire large-diameter transparent pipe 32 has the constant inner diameter region that is constant at the inner diameter D32, the large-diameter transparent pipe 32 serving as the imaging pipe can be realized with a relatively simple structure.

Further, because the constituent material of the pipe inner surface S32 of the large-diameter transparent pipe 32 has hydrophilicity, even if the dew condensation occurs in the large-diameter transparent pipe 32, it is possible to suppress a phenomenon in which the condensed liquid adheres to the pipe inner surface S32 of the large-diameter transparent pipe 32 as a water droplet.

Note that the inner surface difference distance Δ14 is desirably set to a length that allows the possibility of the reflected component of the mist-containing gas G3 reaching the pipe inner surface S42 of the intermediate pipe 42 to be sufficiently low even if the gas reflecting phenomenon P40 of the mist-containing gas G3 occurs.

Further, the inner surface difference distance Δ13 is desirably set to a length that allows the possibility of the liquid component that has fallen by its own weight reaching the pipe inner surface S32 of the large-diameter transparent pipe 32 to be reduced to substantially "zero" even if the liquid falls along the pipe inner surface S42 of the intermediate pipe 42.

In the seventh embodiment, the configurations of the first embodiment shown in FIGS. 1 to 8 are adopted as the configurations of the mist flow rate measuring apparatus and the ultrasonic atomization system excluding the external discharge pipe. However, the configurations of the second to fourth embodiments shown in FIGS. 9 to 11 may be adopted instead of those of the first embodiment.

Eighth Embodiment

Figure 19:
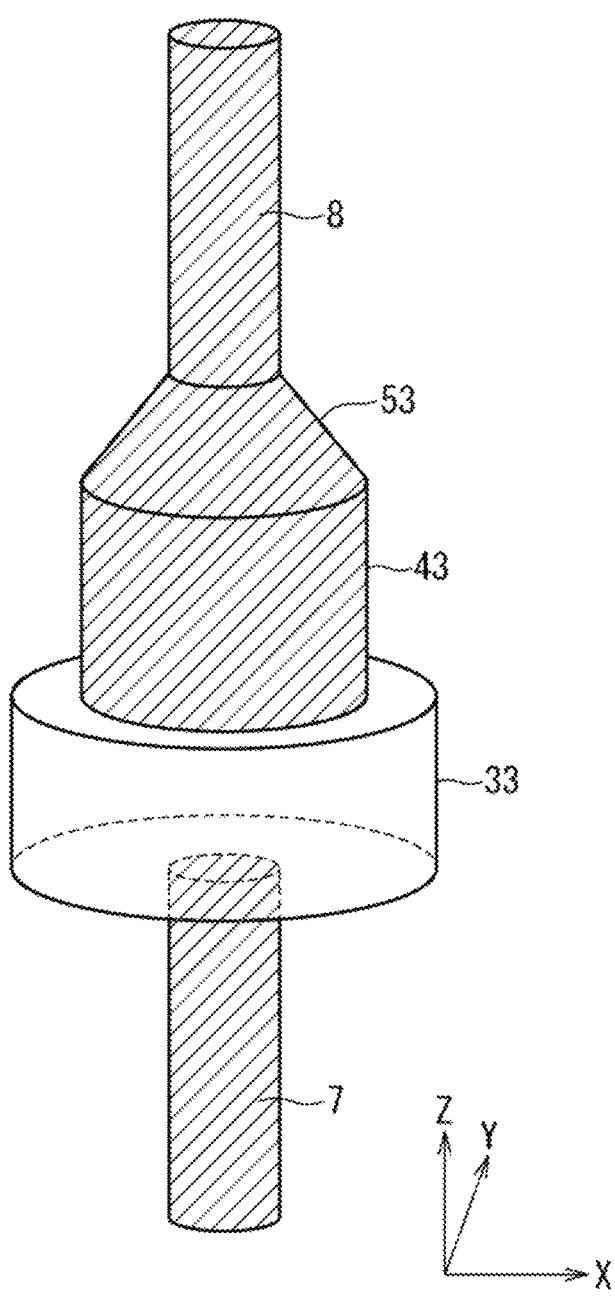
FIG. 19 is a perspective view showing the large-diameter transparent pipe, the intermediate pipe, and the tapered pipe shown in FIG. 18 and the entire peripheral structure thereof.

FIG. 18 is an explanatory view showing cross-sectional structures of an upstream pipe 7, a large-diameter transparent pipe 33, an intermediate pipe 43, a tapered pipe 53, and a downstream pipe 8 in a mist flow rate measuring apparatus of an eighth embodiment. FIG. 19 is a perspective view showing an entire structure of the upstream pipe 7, the large-diameter transparent pipe 33, the intermediate pipe 43, the tapered pipe 53, and the downstream pipe 8. In each of FIGS. 18 and 19, an XYZ orthogonal coordinate system is shown.

In the mist flow rate measuring apparatus of the eighth embodiment, the configuration other than an external discharge pipe including the upstream pipe 7, the large-diameter transparent pipe 33, the intermediate pipe 43, the tapered pipe 53, and the downstream pipe 8 is the same as the configuration of the mist flow rate measuring apparatus of the first embodiment shown in FIGS. 1 to 8. However, the upstream pipe 7, the intermediate pipe 43, the tapered pipe 53, and the downstream pipe 8 are included in the main constituent elements of the mist flow rate measuring apparatus together with the large-diameter transparent pipe 33.

A mist flow rate measuring apparatus of the eighth embodiment is different from that of the first embodiment in that the transparent pipe 10 shown in FIG. 1 is replaced with the large-diameter transparent pipe 33, the intermediate pipe 43, and the tapered pipe 53.

In eighth embodiment, the external discharge pipe is constituted of a combination of the upstream pipe 7, the large-diameter transparent pipe 33, the intermediate pipe 43, the tapered pipe 53, and the downstream pipe 8. The upstream pipe 7 serves as the first gas supply pipe, the downstream pipe 8 serves as the second gas supply pipe, the large-diameter transparent pipe 33 serves as the imaging pipe, the intermediate pipe 43 serves as the first imaging auxiliary pipe, and the tapered pipe 53 serves as a second auxiliary imaging pipe.

In addition, the configuration of the ultrasonic atomization system excluding the mist flow rate measuring apparatus is similar to the configuration of the ultrasonic atomization system 1001 of the first embodiment shown in FIG. 1.

As shown in FIGS. 18 and 19, the upstream pipe 7, the large-diameter transparent pipe 33, the intermediate pipe 43, the tapered pipe 53, and the downstream pipe 8 constituting the external discharge pipe are respectively disposed along the Z direction parallel to the vertical direction. Then, the upstream pipe 7 and the large-diameter transparent pipe 33, the large-diameter transparent pipe 33 and the intermediate pipe 43, the intermediate pipe 43 and the tapered pipe 53, and the tapered pipe 53 and the downstream pipe 8, are respectively directly coupled to each other. The upstream pipe 7, the large-diameter transparent pipe 33, the intermediate pipe 43, the tapered pipe 53, and the downstream pipe 8 may be integrally formed.

Therefore, a mist-containing gas G3 supplied from an ultrasonic atomization apparatus 100 (see FIG. 1) flows through the upstream pipe 7, the large-diameter transparent pipe 33, the intermediate pipe 43, the tapered pipe 53, and the downstream pipe 8 in this order along a predetermined direction, that is, the counter-vertical direction (+Z direction).

As described above, a flow path of the mist-containing gas G3 is provided in each of the upstream pipe 7, the large-diameter transparent pipe 33, the intermediate pipe 43, the tapered pipe 53, and the downstream pipe 8. That is, each of the upstream pipe 7, the large-diameter transparent pipe 33, the intermediate pipe 43, the tapered pipe 53, and the downstream pipe 8 has the mist flowing region therein.

In addition, the cross-sectional shape of each of the upstream pipe 7, the large-diameter transparent pipe 33, the intermediate pipe 43, and the downstream pipe 8 is a circular shape having a constant inner diameter. The cross-sectional shape of the tapered pipe 53 is a circular shape. The upstream pipe 7 has an inner diameter D7, the large-diameter transparent pipe 33 has an inner diameter D33, the intermediate pipe 43 has an inner diameter D43, and the downstream pipe 8 has an inner diameter D8.

In the eighth embodiment, the entire large-diameter transparent pipe 33 has a constant inner diameter region with the inner diameter D33. The large-diameter transparent pipe 33 and the intermediate pipe 43 each have a predetermined length along the Z direction.

A constituent material of the large-diameter transparent pipe 33, which is the imaging pipe, has transparency. Further, a constituent material of a pipe inner surface S33 of the large-diameter transparent pipe 33 has hydrophilicity. In the eighth embodiment, the pipe inner surface S33 of the large-diameter transparent pipe 33 is an inner surface of the constant inner diameter region.

It is desirable that constituent materials of a pipe inner surface S7 of the upstream pipe 7, a pipe inner surface S43 of the intermediate pipe 43, the pipe inner surface S53 of the tapered pipe 53, and a pipe inner surface S8 of the downstream pipe 8 also have hydrophilicity. On the other hand, because the upstream pipe 7, the intermediate pipe 43, the tapered pipe 53, and the downstream pipe 8 are not imaging pipes, these pipes do not need to have transparency. In addition, the thickness of each of the upstream pipe 7, the large-diameter transparent pipe 33, the intermediate pipe 43, the tapered pipe 53, and the downstream pipe 8 is optionally set.

In the mist flow rate measuring apparatus of the eighth embodiment, a part of the mist flowing region in the large-diameter transparent pipe 33, which is the imaging pipe, is the imaging target region of a camera 5, which is the mist imaging camera.

In FIG. 19, a white portion indicates a transparent portion, and a diagonal hatched portion indicates a non-transparent portion. As shown in FIG. 19, the external discharge pipe of the eighth embodiment includes the large-diameter transparent pipe 33 having transparency, and the upstream pipe 7, the intermediate pipe 43, the tapered pipe 53, and the downstream pipe 8 not having transparency.

Regarding the external discharge pipe of the eighth embodiment, the inner diameter D7 of the upstream pipe 7 and the inner diameter D8 of the downstream pipe 8 are set to the same value. The inner diameter D43 of the intermediate pipe 43 is set to a value larger than each of the inner diameters D7 and D8. That is, the intermediate pipe 43, the upstream pipe 7, and the downstream pipe 8 have a magnitude relationship with respect to the inner diameter of $\{D43>D8=D7\}$.

Meanwhile, the inner diameter D33 of the large-diameter transparent pipe 33, the entire of which is the constant inner diameter region, is set to a value larger than the inner diameter D43. That is, the large-diameter transparent pipe 33 and the intermediate pipe 43 have a magnitude relationship with respect to the inner diameter of $\{D33>D43 (D7=D8)\}$. Note that the upstream pipe 7, the large-diameter transparent pipe 33, the intermediate pipe 43, the tapered pipe 53, and the downstream pipe 8 have central positions that match with each other in plan view.

In the tapered pipe 53, which is the second imaging auxiliary pipe, a lowermost end that is to be a lower connection part with the intermediate pipe 43, which is the first imaging auxiliary pipe, has the same inner diameter as the inner diameter D43 of the intermediate pipe 43, and an uppermost end that is to be an upper connection part with the downstream pipe 8, which is the second gas supply pipe, has the same inner diameter as the inner diameter D8 of the downstream pipe 8.

The tapered pipe 53 has a tapered shape in which the inner diameter decreases from the inner diameter D43 to the inner diameter D8 in the counter-vertical direction (+Z direction) that is a direction diametrically opposite to the vertical direction (−Z direction).

Regarding the external discharge pipe of the mist flow rate measuring apparatus of the eighth embodiment, the inner diameter D33 of the large-diameter transparent pipe 33 (constant inner diameter region), which is the imaging pipe, is larger than the inner diameters D7 and D8 of the upstream pipe 7 and the downstream pipe 8 serving as the first and second gas supply pipes.

Therefore, similarly to the sixth embodiment, the mist flow rate measuring apparatus of the eighth embodiment can suppress the occurrence of dew condensation on the pipe inner surface S33 of the large-diameter transparent pipe 33 and satisfactorily execute the imaging processing by the camera 5, which is the mist imaging camera.

As a result, similarly to the sixth and seventh embodiments, the mist flow rate measuring apparatus of the eighth embodiment has an effect of being able to accurately measure the flow rate of the raw material mist by improving the above-described inhibition factor in the imaging processing.

In the eighth embodiment, because the inner diameter D43 of the intermediate pipe 43, which is the first imaging auxiliary pipe, is smaller than the inner diameter D33 of the large-diameter transparent pipe 33 (constant inner diameter region), an inner surface difference distance $\Delta 23$ (=(D33–D43)/2) is generated between the pipe inner surface S43 of the intermediate pipe 43 and the pipe inner surface S33 of the large-diameter transparent pipe 33. Because the inner diameter D43 of the intermediate pipe 43 is larger than the inner diameter D8 of the downstream pipe 8, an inner surface difference distance $\Delta 24$ (=(D43–D8)/2) is generated between the pipe inner surface S43 of the intermediate pipe 43 and the pipe inner surface S8 of the downstream pipe 8. The inner surface difference distance $\Delta 23$ is the third inner surface difference distance, and the inner surface difference distance $\Delta 24$ is the fourth inner surface difference distance.

Because the external discharge pipe of the eighth embodiment has the inner surface difference distances $\Delta 23$ and $\Delta 24$ similarly to the inner surface difference distances $\Delta 13$ and $\Delta 14$ in the seventh embodiment, as in the seventh embodiment, the external discharge pipe can suppress the occurrence of dew condensation on the pipe inner surface S33 of the large-diameter transparent pipe 33 and satisfactorily execute the imaging processing by the camera 5, which is the mist imaging camera.

When the mist-containing gas G3 is propagated from the intermediate pipe 43 to the downstream pipe 8 via the tapered pipe 53, which is the second imaging auxiliary pipe, a part of the mist-containing gas is reflected back from the downstream pipe 8 by the portion where the inner surface difference distance $\Delta 24$, which is the fourth inner surface difference distance, is generated.

However, because the tapered pipe 53 provided between the intermediate pipe 43 and the downstream pipe 8 has a tapered shape in which the inner diameter decreases in the counter-vertical direction (+Z direction), the amount of the mist-containing gas G3 reflected from the downstream pipe 8 can be effectively suppressed.

As a result, the mist flow rate measuring apparatus of the eighth embodiment can effectively suppress the occurrence of dew condensation in the pipe inner surface S33 of the large-diameter transparent pipe 33 by the tapered pipe 53 being provided between the intermediate pipe 43 and the downstream pipe 8, and can more satisfactorily execute the imaging processing by the camera 5 than that of the seventh embodiment.

In addition, in the eighth embodiment, because the entire large-diameter transparent pipe 33 has the constant inner diameter region that is constant at the inner diameter D33, the large-diameter transparent pipe 33 serving as the imaging pipe can be realized with a relatively simple structure.

Further, because the constituent material of the pipe inner surface S33 of the large-diameter transparent pipe 33 has hydrophilicity, even if the dew condensation occurs in the large-diameter transparent pipe 33, it is possible to suppress a phenomenon in which the condensed liquid adheres to the pipe inner surface S33 of the large-diameter transparent pipe 33 as a water droplet.

Note that the inner surface difference distance $\Delta 24$ is desirably set to a length that allows the possibility of the reflected component of the mist-containing gas G3 reaching the pipe inner surface S43 of the intermediate pipe 43 to be sufficiently low even if the gas reflecting phenomenon of the mist-containing gas G3 occurs.

Further, the inner surface difference distance $\Delta 23$ is desirably set to a length that allows the possibility of the liquid component that has fallen by its own weight reaching the pipe inner surface S33 of the large-diameter transparent pipe 33 to be reduced to substantially "zero" even if the liquid falls along the pipe inner surface S43 of the intermediate pipe 43.

In the eighth embodiment, the configurations of the first embodiment shown in FIGS. 1 to 8 are adopted as the configurations of the mist flow rate measuring apparatus and the ultrasonic atomization system excluding the external discharge pipe. However, the configurations of the second to fourth embodiments shown in FIGS. 9 to 11 may be adopted instead of those of the first embodiment.

Ninth Embodiment

Figure 20:
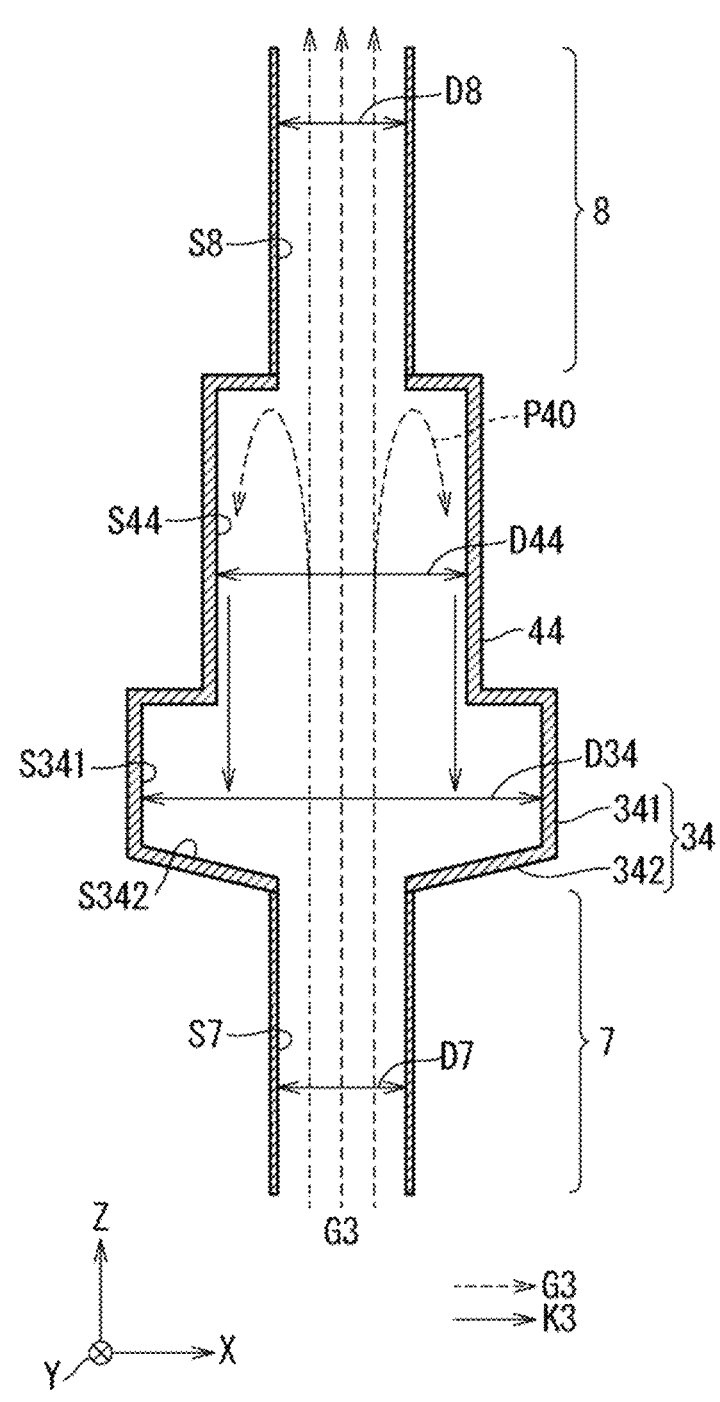
FIG. 20 is an explanatory view showing cross-sectional structures of an upstream pipe, a large-diameter transparent pipe, an intermediate pipe, and a downstream pipe in a mist flow rate measuring apparatus of a ninth embodiment.
Figure 21:
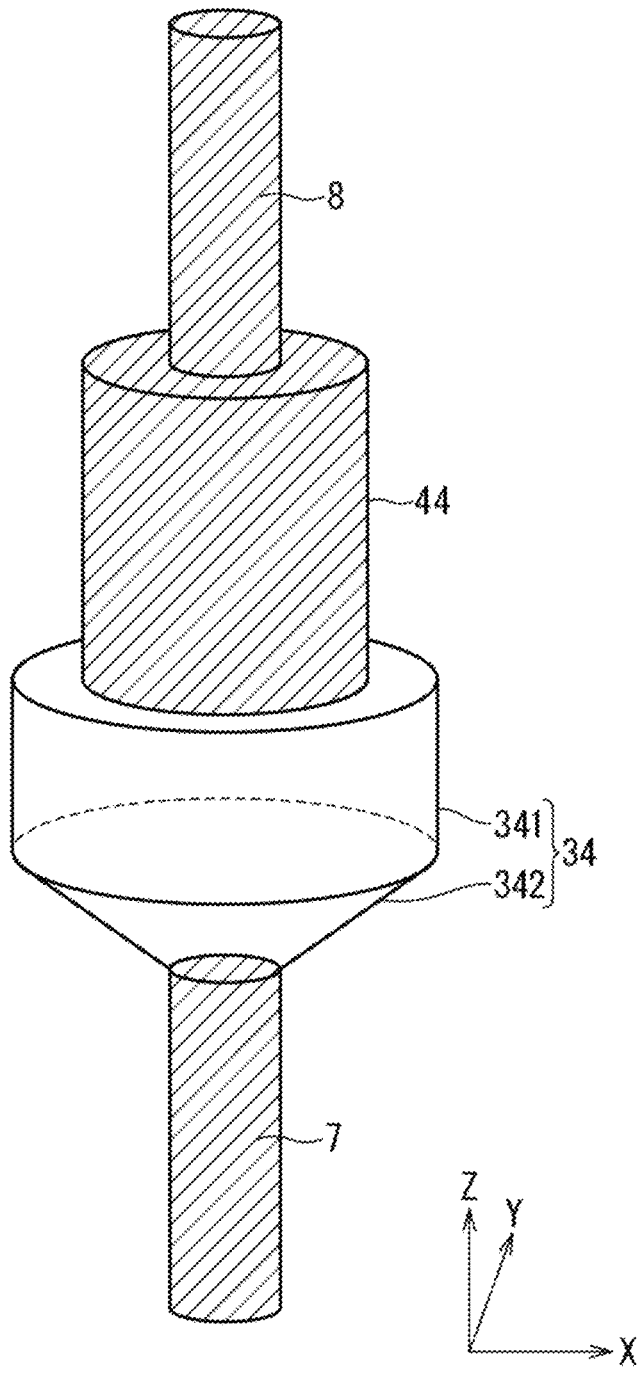
FIG. 21 is a perspective view showing the large-diameter transparent pipe and the intermediate pipe shown in FIG. 20 and the entire peripheral structure thereof.

FIG. 20 is an explanatory view showing cross-sectional structures of an upstream pipe 7, a large-diameter transparent pipe 34, an intermediate pipe 44, and a downstream pipe 8 in a mist flow rate measuring apparatus of a ninth embodiment. FIG. 21 is a perspective view showing an entire structure of the upstream pipe 7, the large-diameter transparent pipe 34, the intermediate pipe 44, and the downstream pipe 8. In each of FIGS. 20 and 21, an XYZ orthogonal coordinate system is shown.

In the mist flow rate measuring apparatus of the ninth embodiment, the configuration other than an external discharge pipe including the upstream pipe 7, the large-diameter transparent pipe 34, the intermediate pipe 44, and the downstream pipe 8 is the same as the configuration of the mist flow rate measuring apparatus of the first embodiment shown in FIGS. 1 to 8. However, the upstream pipe 7, the intermediate pipe 44, and the downstream pipe 8 are included in the main constituent elements of the mist flow rate measuring apparatus together with the large-diameter transparent pipe 34.

A mist flow rate measuring apparatus of the ninth embodiment is different from that of the first embodiment in that the transparent pipe 10 shown in FIG. 1 is replaced with the large-diameter transparent pipe 34 and the intermediate pipe 44.

In the ninth embodiment, the external discharge pipe is constituted of a combination of the upstream pipe 7, the large-diameter transparent pipe 34, the intermediate pipe 44, and the downstream pipe 8. The upstream pipe 7 serves as the first gas supply pipe, the downstream pipe 8 serves as the second gas supply pipe, the large-diameter transparent pipe 34 serves as the imaging pipe, and the intermediate pipe 44 serves as the first imaging auxiliary pipe.

In addition, the configuration of the ultrasonic atomization system excluding the mist flow rate measuring apparatus is similar to the configuration of the ultrasonic atomization system 1001 of the first embodiment shown in FIG. 1.

As shown in FIGS. 20 and 21, the upstream pipe 7, the large-diameter transparent pipe 34, the intermediate pipe 44, and the downstream pipe 8 constituting the external discharge pipe are respectively disposed along the Z direction parallel to the vertical direction. Then, the upstream pipe 7 and the large-diameter transparent pipe 34, the large-diameter transparent pipe 34 and the intermediate pipe 44, and the intermediate pipe 44 and the downstream pipe 8, are respectively directly coupled to each other. The upstream pipe 7, the large-diameter transparent pipe 34, the intermediate pipe 44, and the downstream pipe 8 may be integrally formed.

The large-diameter transparent pipe 34 includes a pipe main part 341 serving as an imaging main part and a pipe tapered part 342 serving as a lower imaging auxiliary part. A lower end part of the pipe main part 341 is directly coupled to an upper end part of the pipe tapered part 342, and a lower end part of the pipe tapered part 342 is directly connected to an upper end part of the upstream pipe 7.

A mist-containing gas G3 supplied from an ultrasonic atomization apparatus 100 (see FIG. 1) flows through the upstream pipe 7, the large-diameter transparent pipe 34, the intermediate pipe 44, and the downstream pipe 8 in this order along a predetermined direction, that is, the counter-vertical direction (+Z direction).

As described above, a flow path of the mist-containing gas G3 is provided in each of the upstream pipe 7, the large-diameter transparent pipe 34, the intermediate pipe 44, and the downstream pipe 8. That is, each of the upstream pipe 7, the large-diameter transparent pipe 34, the intermediate pipe 44, and the downstream pipe 8 has the mist flowing region therein.

In addition, the cross-sectional shape of each of the upstream pipe 7, the pipe main part 341 of the large-diameter transparent pipe 34, the intermediate pipe 44, and the downstream pipe 8 is a circular shape having a constant inner diameter. The cross-sectional shape of the pipe tapered part 342 of the large-diameter transparent pipe 34 is a circular shape. The upstream pipe 7 has an inner diameter D7, the pipe main part 341 in the large-diameter transparent pipe 34 has an inner diameter D34, the intermediate pipe 44 has an inner diameter D44, and the downstream pipe 8 has an inner diameter D8.

Therefore, in the ninth embodiment, the entire pipe main part 341 in the large-diameter transparent pipe 34 has a constant inner diameter region with the inner diameter D34. The large-diameter transparent pipe 34 and the intermediate pipe 44 each have a predetermined length along the Z direction.

A constituent material of the large-diameter transparent pipe 34, which is the imaging pipe, has transparency. Further, in the large-diameter transparent pipe 34, the constituent materials of the main part inner surface S341 of the pipe main part 341 and the tapered part inner surface S342 of the pipe tapered part 342 have hydrophilicity. In the ninth embodiment, the main part inner surface S341 of the pipe main part 341 is an inner surface of the constant inner diameter region.

It is desirable that constituent materials of a pipe inner surface S7 of the upstream pipe 7, a pipe inner surface S44 of the intermediate pipe 44, and a pipe inner surface S8 of the downstream pipe 8 also have hydrophilicity. On the other hand, because the upstream pipe 7, the intermediate pipe 44, and the downstream pipe 8 are not imaging pipes, these pipes do not need to have transparency. In addition, the thickness of each of the upstream pipe 7, the large-diameter transparent pipe 34, the intermediate pipe 44, and the downstream pipe 8 is optionally set.

In the mist flow rate measuring apparatus of the ninth embodiment, a part of the mist flowing region in the large-diameter transparent pipe 34, which is the imaging pipe, is the imaging target region of a camera 5, which is the mist imaging camera. Note that a part of the mist flowing region in the pipe main part 341 serving as the imaging main part is desirably the imaging target region of the camera 5.

In FIG. 21, a white portion indicates a transparent portion, and a diagonal hatched portion indicates a non-transparent portion. As shown in FIG. 21, the external discharge pipe of the ninth embodiment includes the large-diameter transparent pipe 34 (the pipe main part 341 and the pipe tapered part 342) having transparency, and the upstream pipe 7, the intermediate pipe 44, and the downstream pipe 8 not having transparency.

Regarding the external discharge pipe of the ninth embodiment, the inner diameter D7 of the upstream pipe 7 and the inner diameter D8 of the downstream pipe 8 are set to the same value. The inner diameter D44 of the intermediate pipe 44 is set to a value larger than each of the inner diameters D7 and D8. That is, the intermediate pipe 44, the upstream pipe 7, and the downstream pipe 8 have a magnitude relationship with respect to the inner diameter of {D44>D8=D7}.

Meanwhile, the inner diameter D34 of the pipe main part 341 (the constant inner diameter region) in the large-diameter transparent pipe 34, is set to a value larger than the inner diameter D44. That is, the pipe main part 341 serving as the imaging main part and the intermediate pipe 44 have a magnitude relationship with respect to the inner diameter of {D34>D44 (D7=D8)}. Note that the upstream pipe 7, the pipe main part 341 and the pipe tapered part 342 in the large-diameter transparent pipe 34, the intermediate pipe 44, and the downstream pipe 8 have central positions that match with each other in plan view.

In the pipe tapered part 342 of the large-diameter transparent pipe 34, an uppermost end that is to be an upper connection part with the pipe main part 341 has the same inner diameter as the inner diameter D34 of the pipe main part 341, and a lowermost end that is to be a lower connection part with the upstream pipe 7 as the first gas supply pipe has the same inner diameter as the inner diameter D7 of the upstream pipe 7.

The pipe tapered part 342 serving as the lower imaging auxiliary part has a tapered shape in which the inner diameter decreases from the inner diameter D34 to the inner diameter D7 in the vertical direction (−Z direction). That is, the pipe tapered part 342 has a vertically protruding structure that is inclined to the vertical direction (−Z direction) side toward the inside.

Regarding the external discharge pipe of the mist flow rate measuring apparatus of the ninth embodiment, the inner diameter D34 of the pipe main part 341 (constant inner diameter region) in the large-diameter transparent pipe 34, which is the imaging pipe, is larger than the inner diameters D7 and D8 of the upstream pipe 7 and the downstream pipe 8 serving as the first and second gas supply pipes.

Therefore, similarly to the sixth to eighth embodiments, the mist flow rate measuring apparatus of the ninth embodiment can suppress the occurrence of dew condensation on the main part inner surface S341 of the pipe main part 341 in the large-diameter transparent pipe 34 and satisfactorily execute the imaging processing by the camera 5, which is the mist imaging camera.

As a result, similarly to the sixth to eighth embodiments, the mist flow rate measuring apparatus of the ninth embodiment can accurately measure the flow rate of the raw material mist by improving the above-described inhibition factor in the imaging processing.

In the ninth embodiment, because the inner diameter D44 of the intermediate pipe 44, which is the first imaging auxiliary pipe, is smaller than the inner diameter D34 of the pipe main part 341 (constant inner diameter region) in the large-diameter transparent pipe 34, an inner surface difference distance $\Delta 33$ (=(D34−D44)/2) is generated between the pipe inner surface S44 of the intermediate pipe 44 and the main part inner surface S341 of the pipe main part 341. Because the inner diameter D44 of the intermediate pipe 44 is larger than the inner diameter D8 of the downstream pipe 8, an inner surface difference distance $\Delta 34$ (=(D44−D8)/2) is generated between the pipe inner surface S44 of the intermediate pipe 44 and the pipe inner surface S8 of the downstream pipe 8. The inner surface difference distance Δ33 is the third inner surface difference distance, and the inner surface difference distance Δ34 is the fourth inner surface difference distance.

Because the external discharge pipe of the ninth embodiment has the inner surface difference distances Δ33 and Δ34 similarly to the inner surface difference distances Δ13 and Δ14 in the seventh embodiment, as in the seventh embodiment, the external discharge pipe can suppress the occurrence of dew condensation on the main part inner surface S341 of the pipe main part 341 in the large-diameter transparent pipe 34 and satisfactorily execute the imaging processing by the camera 5, which is the mist imaging camera.

When the mist-containing gas G3 is propagated from the intermediate pipe 44 to the downstream pipe 8, a part of the mist-containing gas G3 is reflected back from the downstream pipe 8 by the portion where the inner surface difference distance Δ34 to be the fourth inner surface difference distance is generated.

However, even if a part of the mist-containing gas G3 is reflected back and falls from the downstream pipe 8 and temporarily adheres to the tapered part inner surface S342 of the large-diameter transparent pipe 34 as a condensed liquid, the pipe tapered part 342 has a vertically protruding structure, and thus the liquid flows from the tapered part inner surface S342 toward the upstream pipe 7 with the lapse of time. Therefore, the condensed liquid does not remain on the tapered part inner surface S342, nor does the condensed liquid flow from the tapered part inner surface S342 to the main part inner surface S341.

As a result, the mist flow rate measuring apparatus of the ninth embodiment can effectively suppress the occurrence of dew condensation on the main part inner surface S341 and the tapered part inner surface S342 of the large-diameter transparent pipe 34, and satisfactorily execute the imaging processing by the camera 5.

Further, because the constituent material of the main part inner surface S341 and the tapered part inner surface S342 of the large-diameter transparent pipe 34 has hydrophilicity, even if the dew condensation occurs in the large-diameter transparent pipe 34, it is possible to suppress a phenomenon in which the condensed liquid adheres to the main part inner surface S341 and the tapered part inner surface S342 of the large-diameter transparent pipe 34 as a water droplet.

Note that the inner surface difference distance Δ34 is desirably set to a length that allows the possibility of the reflected component of the mist-containing gas G3 reaching the pipe inner surface S44 of the intermediate pipe 44 to be sufficiently low even if the gas reflecting phenomenon of the mist-containing gas G3 from the downstream pipe 8 occurs.

Further, the inner surface difference distance Δ33 is desirably set to a length that allows the possibility of the liquid component that has fallen by its own weight directly reaching the main part inner surface S341 of the pipe main part 341 in the large-diameter transparent pipe 34 to be reduced to substantially "zero" even if the liquid falls along the pipe inner surface S44 of the intermediate pipe 44.

In the ninth embodiment, the configurations of the first embodiment shown in FIGS. 1 to 8 are adopted as the configurations of the mist flow rate measuring apparatus and the ultrasonic atomization system excluding the external discharge pipe. However, the configurations of the second to fourth embodiments shown in FIGS. 9 to 11 may be adopted instead of those of the first embodiment.

Tenth Embodiment

Figure 22:
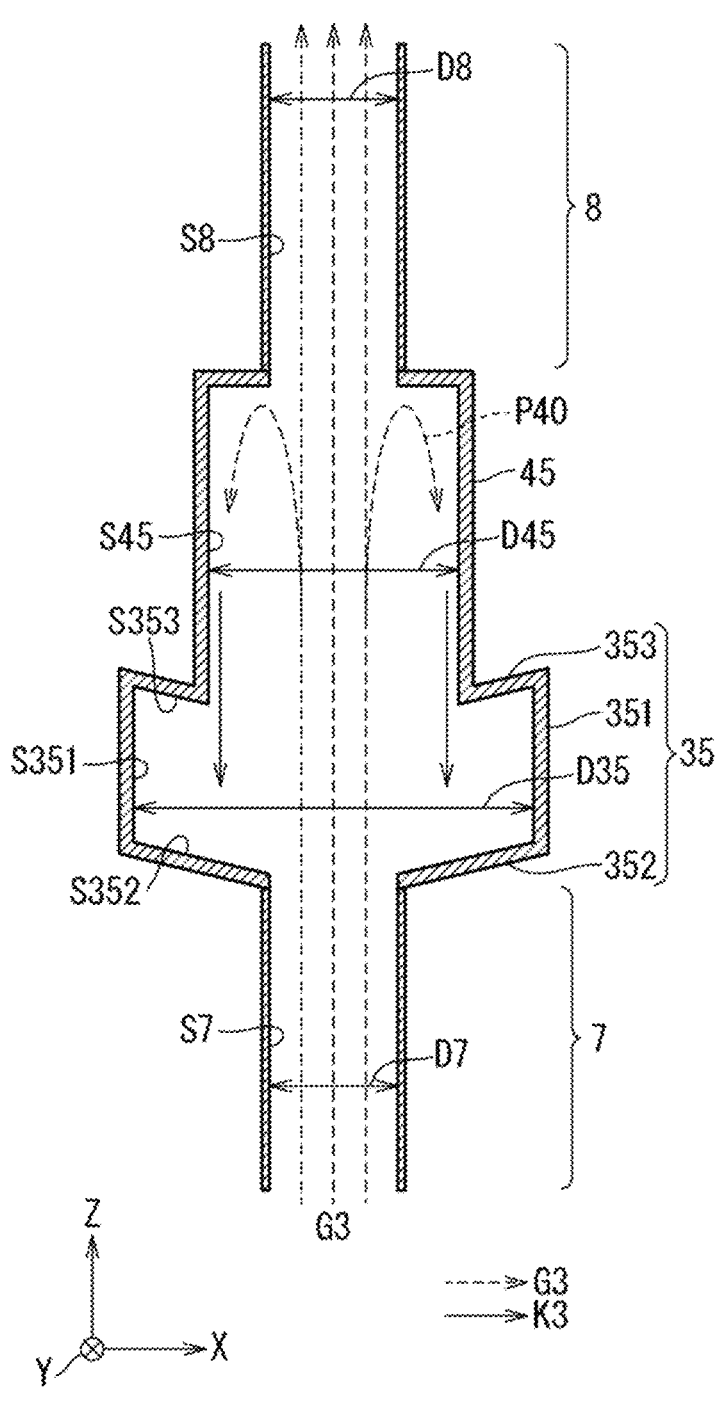
FIG. 22 is an explanatory view showing cross-sectional structures of an upstream pipe, a large-diameter transparent pipe, an intermediate pipe, and a downstream pipe in a mist flow rate measuring apparatus of a tenth embodiment.
Figure 23:
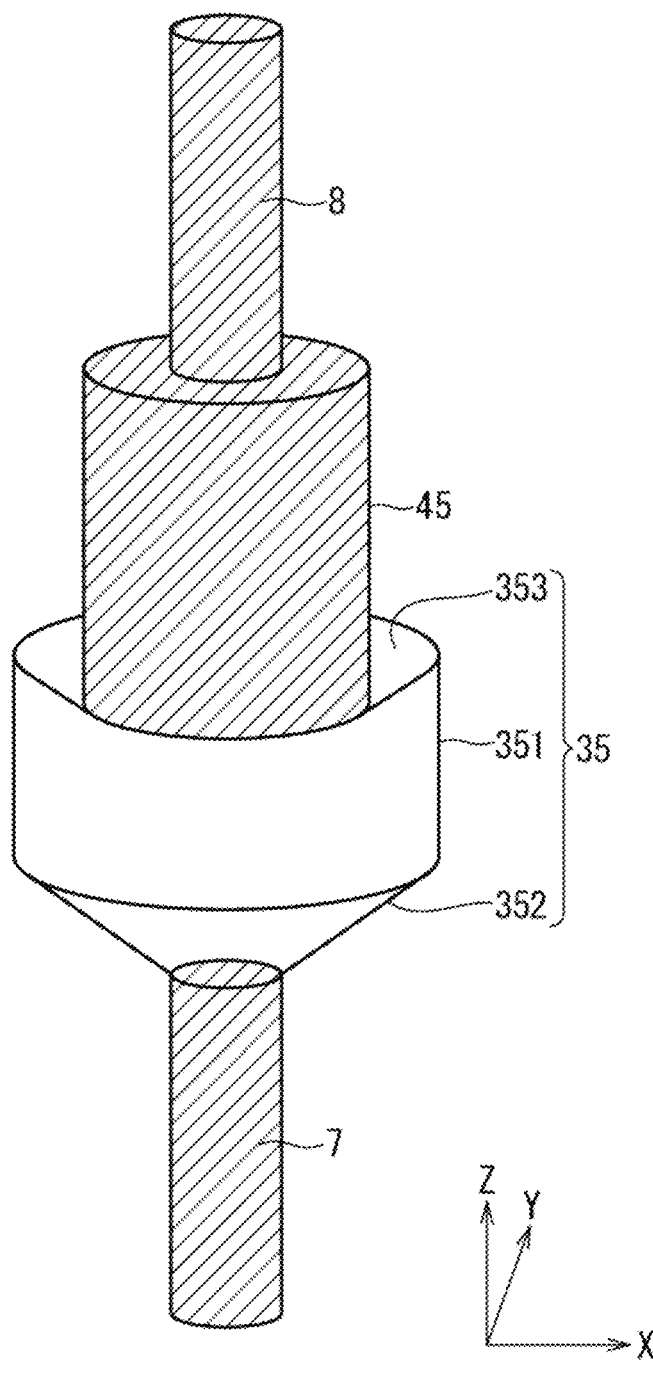
FIG. 23 is a perspective view showing the large-diameter transparent pipe and the intermediate pipe shown in FIG. 22 and the entire peripheral structure thereof.

FIG. 22 is an explanatory view showing cross-sectional structures of an upstream pipe 7, a large-diameter transparent pipe 35, an intermediate pipe 45, and a downstream pipe 8 in a mist flow rate measuring apparatus of a tenth embodiment. FIG. 23 is a perspective view showing an entire structure of the upstream pipe 7, the large-diameter transparent pipe 35, the intermediate pipe 45, and the downstream pipe 8. In each of FIGS. 22 and 23, an XYZ orthogonal coordinate system is shown.

In the mist flow rate measuring apparatus of the tenth embodiment, the configuration other than an external discharge pipe including the upstream pipe 7, the large-diameter transparent pipe 35, the intermediate pipe 45, and the downstream pipe 8 is the same as the configuration of the mist flow rate measuring apparatus of the first embodiment shown in FIGS. 1 to 8. However, the upstream pipe 7, the intermediate pipe 45, and the downstream pipe 8 are included in the main constituent elements of the mist flow rate measuring apparatus together with the large-diameter transparent pipe 35.

A mist flow rate measuring apparatus of the tenth embodiment is different from that of the first embodiment in that the transparent pipe 10 shown in FIG. 1 is replaced with the large-diameter transparent pipe 35 and the intermediate pipe 45.

In the tenth embodiment, the external discharge pipe is constituted of a combination of the upstream pipe 7, the large-diameter transparent pipe 35, the intermediate pipe 45, and the downstream pipe 8. The upstream pipe 7 serves as the first gas supply pipe, the downstream pipe 8 serves as the second gas supply pipe, the large-diameter transparent pipe 35 serves as the imaging pipe, and the intermediate pipe 45 serves as the first imaging auxiliary pipe.

In addition, the configuration of the ultrasonic atomization system excluding the mist flow rate measuring apparatus is similar to the configuration of the ultrasonic atomization system 1001 of the first embodiment shown in FIG. 1.

As shown in FIGS. 22 and 23, the upstream pipe 7, the large-diameter transparent pipe 35, the intermediate pipe 45, and the downstream pipe 8 constituting the external discharge pipe are respectively disposed along the Z direction parallel to the vertical direction. Then, the upstream pipe 7 and the large-diameter transparent pipe 35, the large-diameter transparent pipe 35 and the intermediate pipe 45, and the intermediate pipe 45 and the downstream pipe 8, are respectively directly coupled to each other. The upstream pipe 7, the large-diameter transparent pipe 35, the intermediate pipe 45, and the downstream pipe 8 may be integrally formed.

The large-diameter transparent pipe 35 includes a pipe main part 351 serving as the imaging main part, a pipe tapered part 352 serving as the lower imaging auxiliary part, and a pipe tapered part 353 serving as an upper imaging auxiliary part.

An upper end part of the pipe main part 351 is directly coupled to an upper end part of the pipe tapered part 353, and a lower end part of the pipe tapered part 353 is directly connected to a lower end part of the intermediate pipe 45. A lower end part of the pipe main part 351 is directly coupled to an upper end part of the pipe tapered part 352, and a lower end part of the pipe tapered part 352 is directly connected to an upper end part of the upstream pipe 7.

A mist-containing gas G3 supplied from an ultrasonic atomization apparatus 100 (see FIG. 1) flows through the upstream pipe 7, the large-diameter transparent pipe 35, the intermediate pipe 45, and the downstream pipe 8 in this order along a predetermined direction, that is, the counter-vertical direction (+Z direction).

As described above, a flow path of the mist-containing gas G3 is provided in each of the upstream pipe 7, the large-diameter transparent pipe 35, the intermediate pipe 45, and the downstream pipe 8. That is, each of the upstream pipe 7, the large-diameter transparent pipe 35, the intermediate pipe 45, and the downstream pipe 8 has the mist flowing region therein.

In addition, the cross-sectional shape of each of the upstream pipe 7, the pipe main part 351 of the large-diameter transparent pipe 35, the intermediate pipe 45, and the downstream pipe 8 is a circular shape having a constant inner diameter. Meanwhile, the cross-sectional shape of each of the pipe tapered parts 352 and 353 of the large-diameter transparent pipe 35 is a circular shape The upstream pipe 7 has an inner diameter D7, the pipe main part 351 in the large-diameter transparent pipe 35 has an inner diameter D35, the intermediate pipe 45 has an inner diameter D45, and the downstream pipe 8 has an inner diameter D8.

In the tenth embodiment, the entire pipe main part 351 in the large-diameter transparent pipe 35 has a constant inner diameter region with the inner diameter D35. The large-diameter transparent pipe 35 and the intermediate pipe 45 each have a predetermined length along the Z direction.

A constituent material of the large-diameter transparent pipe 35, which is the imaging pipe, has transparency. Further, in the large-diameter transparent pipe 35, the constituent materials of the main part inner surface S351 of the pipe main part 351, the tapered part inner surface S352 of the pipe tapered part 352, and the tapered part inner surface S353 of the pipe tapered part 353 have hydrophilicity. In the tenth embodiment, the main part inner surface S351 of the pipe main part 351 is an inner surface of the constant inner diameter region.

It is desirable that constituent materials of a pipe inner surface S7 of the upstream pipe 7, a pipe inner surface S45 of the intermediate pipe 45, and a pipe inner surface S8 of the downstream pipe 8 also have hydrophilicity. On the other hand, because the upstream pipe 7, the intermediate pipe 45, and the downstream pipe 8 are not imaging pipes, these pipes do not need to have transparency. In addition, the thickness of each of the upstream pipe 7, the large-diameter transparent pipe 35, the intermediate pipe 45, and the downstream pipe 8 is optionally set.

In the mist flow rate measuring apparatus of the tenth embodiment, a part of the mist flowing region in the large-diameter transparent pipe 35, which is the imaging pipe, is the imaging target region of a camera 5, which is the mist imaging camera. Note that a part of the mist flowing region in the pipe main part 351, which is the imaging main part, is desirably the imaging target region of the camera 5.

In FIG. 23, a white portion indicates a transparent portion, and a diagonal hatched portion indicates a non-transparent portion. As shown in FIG. 23, the external discharge pipe of the tenth embodiment includes the large-diameter transparent pipe 35 having transparency, and the upstream pipe 7, the intermediate pipe 45, and the downstream pipe 8 not having transparency.

Regarding the external discharge pipe of the tenth embodiment, the inner diameter D7 of the upstream pipe 7 and the inner diameter D8 of the downstream pipe 8 are set to the same value. The inner diameter D45 of the intermediate pipe 45 is set to a value larger than each of the inner diameters D7 and D8. That is, the intermediate pipe 45, the upstream pipe 7, and the downstream pipe 8 have a magnitude relationship with respect to the inner diameter of {D45>D8=D7}.

Meanwhile, the inner diameter D35 of the pipe main part 351 (the constant inner diameter region) of the large-diameter transparent pipe 35, is set to a value larger than the inner diameter D45. That is, the pipe main part 351 serving as the imaging main part and the intermediate pipe 45 have a magnitude relationship with respect to the inner diameter of {D35>D45 (D7=D8)}. Note that the upstream pipe 7, the pipe main part 351 and the pipe tapered parts 352 and 353 in the large-diameter transparent pipe 35, the intermediate pipe 45, and the downstream pipe 8 have central positions that match with each other in plan view.

In the pipe tapered part 352 of the large-diameter transparent pipe 35, an uppermost end that is to be an upper connection part with the pipe main part 351 has the same inner diameter as the inner diameter D35 of the pipe main part 351, and a lowermost end that is to be a lower connection part with the upstream pipe 7 as the first gas supply pipe has the same inner diameter as the inner diameter D7 of the upstream pipe 7.

The pipe tapered part 352 serving as the lower imaging auxiliary part has a tapered shape in which the inner diameter decreases from the inner diameter D35 to the inner diameter D7 in the vertical direction (−Z direction). That is, the pipe tapered part 352 has a vertically protruding structure that is inclined to the vertical direction (−Z direction) side toward the inside.

In the tenth embodiment, the pipe main part 351 and the intermediate pipe 45 have a positional relationship in which the uppermost end of the pipe main part 351 is higher than the lowermost end of the intermediate pipe 45.

In the pipe tapered part 353 of the large-diameter transparent pipe 35, an uppermost end that is to be an upper connection part with the pipe main part 351 has the same inner diameter as the inner diameter D35 of the pipe main part 351, and a lowermost end that is to be a lower connection part with the intermediate pipe 45 has the same inner diameter as the inner diameter D45 of the intermediate pipe 45.

The pipe tapered part 353 serving as the upper imaging auxiliary part has a tapered shape in which the inner diameter decreases from the inner diameter D35 to the inner diameter D45 in the vertical direction (−Z direction). That is, the pipe tapered part 353 has a vertically protruding structure that is inclined to the vertical direction (−Z direction) side toward the inside.

Regarding the external discharge pipe of the mist flow rate measuring apparatus of the tenth embodiment, the inner diameter D35 of the pipe main part 351 (constant inner diameter region) in the large-diameter transparent pipe 35, which is the imaging pipe, is larger than the inner diameters D7 and D8 of the upstream pipe 7 and the downstream pipe 8 serving as the first and second gas supply pipes.

Therefore, similarly to the sixth to ninth embodiments, the mist flow rate measuring apparatus of the tenth embodiment can suppress the occurrence of dew condensation on the main part inner surface S351 of the pipe main part 351 in the large-diameter transparent pipe 35 and satisfactorily execute the imaging processing by the camera 5, which is the mist imaging camera.

As a result, similarly to the sixth to ninth embodiments, the mist flow rate measuring apparatus of the tenth embodiment can accurately measure the flow rate of the raw material mist by improving the above-described inhibition factor in the imaging processing.

In the tenth embodiment, because the inner diameter D45 of the intermediate pipe 45, which is the first imaging auxiliary pipe, is smaller than the inner diameter D35 of the pipe main part 351 (constant inner diameter region) in the large-diameter transparent pipe 35, an inner surface difference distance Δ43 (=(D35−D45)/2) is generated between the pipe inner surface S45 of the intermediate pipe 45 and the main part inner surface S351 of the pipe main part 351 in the large-diameter transparent pipe 35. Because the inner diameter D45 of the intermediate pipe 45 is larger than the inner diameter D8 of the downstream pipe 8, an inner surface difference distance $\Delta44$ (=(D45–D8)/2) is generated between the pipe inner surface S45 of the intermediate pipe 45 and the pipe inner surface S8 of the downstream pipe 8. The inner surface difference distance $\Delta43$ is the third inner surface difference distance, and the inner surface difference distance $\Delta44$ is the fourth inner surface difference distance.

Because the external discharge pipe of the tenth embodiment has the inner surface difference distances $\Delta43$ and $\Delta44$ similarly to the inner surface difference distances $\Delta13$ and $\Delta14$ in the seventh embodiment, as in the seventh embodiment, the external discharge pipe can suppress the occurrence of dew condensation on the main part inner surface S351 of the pipe main part 351 in the large-diameter transparent pipe 35 and satisfactorily execute the imaging processing by the camera 5, which is the mist imaging camera.

When the mist-containing gas G3 is propagated from the intermediate pipe 45 to the downstream pipe 8, a part of the mist-containing gas G3 is reflected back from the downstream pipe 8 by the portion where the inner surface difference distance $\Delta44$ to be the fourth inner surface difference distance is generated.

A gas reflecting phenomenon P40 in which a part of the mist-containing gas G3 is reflected back and falls from the downstream pipe 8 occurs, and there is a possibility that the gas temporarily adheres to the tapered part inner surface S352 of the large-diameter transparent pipe 35 as a condensed liquid. However, even if the liquid adheres to the tapered part inner surface S352, because the pipe tapered part 352 has a vertically protruding structure, the liquid flows from the tapered part inner surface S352 toward the side of the upstream pipe 7, which is the first gas supply pipe, with the lapse of time. Therefore, the condensed liquid does not remain on the tapered part inner surface S352, nor does the condensed liquid flow from the tapered part inner surface S352 to the main part inner surface S351.

As a result, similarly to the ninth embodiment, the mist flow rate measuring apparatus of the tenth embodiment can effectively suppress the occurrence of dew condensation on the main part inner surface S351 and the tapered part inner surface S352 of the large-diameter transparent pipe 35, and satisfactorily execute the imaging processing by the mist imaging camera.

When the mist-containing gas G3 is propagated from the intermediate pipe 45 to the downstream pipe 8, a part of the mist-containing gas G3 is reflected back from the downstream pipe 8 by the portion where the inner surface difference distance $\Delta44$, which is the fourth inner surface difference distance, is generated. At this time, there is an inner surface transmission path from the pipe inner surface S45 of the intermediate pipe 45 through the tapered part inner surface S353 of the pipe tapered part 353, which is the upper imaging auxiliary part, to the main part inner surface S351 of the pipe main part 351, which is the imaging main part.

Meanwhile, because the pipe tapered part 353 has the vertically protruding structure, the tapered part inner surface S353 to be a part of the inner surface transmission path becomes a counter-vertical direction component (+Z direction component). Therefore, the possibility that the condensed liquid flows through the inner surface transmission path can be effectively reduced.

This is because when the liquid flows from the tapered part inner surface S353 to the main part inner surface S351, the inner surface transmission path includes the counter-vertical direction component due to the tapered part inner surface S353, which increases the possibility that the liquid temporarily adhering to the tapered part inner surface S353 falls by its own weight. Therefore, the phenomenon that the condensed liquid flows from the tapered part inner surface S353 to the main part inner surface S351 can be reduced to substantially "zero".

As a result, the mist flow rate measuring apparatus of the tenth embodiment can effectively suppress the occurrence of dew condensation on the main part inner surface S351 and the tapered part inner surfaces S352 and S353 of the large-diameter transparent pipe 35, and satisfactorily execute the imaging processing by the mist imaging camera.

Further, because the constituent material of the main part inner surface S351 and the tapered part inner surfaces S352 and S353 of the large-diameter transparent pipe 35 has hydrophilicity, even if the dew condensation occurs in the large-diameter transparent pipe 35, it is possible to suppress a phenomenon in which the condensed liquid adheres to the main part inner surface S351 and the tapered part inner surfaces S352 and S353 of the large-diameter transparent pipe 35 as a water droplet.

Note that the inner surface difference distance $\Delta44$ is desirably set to a length that allows the possibility of the reflected component of the mist-containing gas G3 reaching the pipe inner surface S45 of the intermediate pipe 45 to be sufficiently low even if the gas reflecting phenomenon of the mist-containing gas G3 from the downstream pipe 8 occurs.

Further, the inner surface difference distance $\Delta43$ is desirably set to a length that allows the possibility of the liquid component that has fallen by its own weight directly reaching the main part inner surface S351 of the pipe main part 351 in the large-diameter transparent pipe 35 to be reduced to substantially "zero" even if the liquid falls along the pipe inner surface S45 of the intermediate pipe 45.

In the tenth embodiment, the configurations of the first embodiment shown in FIGS. 1 to 8 are adopted as the configurations of the mist flow rate measuring apparatus and the ultrasonic atomization system excluding the external discharge pipe. However, the configurations of the second to fourth embodiments shown in FIGS. 9 to 11 may be adopted instead of those of the first embodiment.

<Others>

Although the present disclosure has been described in detail, the above description is illustrative in all aspects, and the present disclosure is not limited thereto. It is understood that countless modifications that are not illustrated can be envisaged without departing from the scope of the present disclosure.

It should be noted that in the present disclosure, each of the embodiments can be freely combined, and each of the embodiments can be appropriately modified and omitted, within the scope of the present disclosure.

For example, the heater 12 used in the third embodiment can be used in the second embodiment, the fourth embodiment, and the fifth embodiment, or the structure including the transparent pipe 10 in the second embodiment to the fourth embodiment can be changed to the structure including the pipe absent space 9 described in the fifth embodiment.

In addition, constitutional parts corresponding to the pipe tapered parts 352 and 353 in the large-diameter transparent pipe 35 of the tenth embodiment may be provided in lower and upper parts of the large-diameter transparent pipe 33 of the eighth embodiment.

The invention claimed is:

1. A mist flow rate measuring apparatus comprising:

a mist imaging camera that executes imaging processing with at least a part of a mist flowing region through which a mist-containing gas containing a raw material mist flows set as an imaging target region to acquire imaging information;

a mist flow rate calculation unit that executes mist flow rate calculation processing of obtaining a flow rate of the raw material mist in the mist-containing gas based on the imaging information;

first and second gas supply pipes each having the mist flowing region inside; and an imaging pipe having the mist flowing region inside, wherein the first and second gas supply pipes each have a cross-sectional shape of a circular shape having a constant inner diameter, the imaging pipe has a cross-sectional shape of a circular shape, and at least a part of the imaging pipe has a constant inner diameter region with a constant inner diameter, the imaging pipe is provided between the first gas supply pipe and the second gas supply pipe, and is constituted of a material having transparency, a part of the mist flowing region in the imaging pipe is the imaging target region, the mist-containing gas flows in an order of the first gas supply pipe, the imaging pipe, and the second gas supply pipe along a predetermined direction opposing a vertical direction, and the constant inner diameter region in the imaging pipe has an inner diameter that is larger than an inner diameter of each of the first and second gas supply pipes, the imaging pipe is disposed along the vertical direction, and the predetermined direction is a counter-vertical direction that is diametrically opposite to the vertical direction, the mist flow rate measuring apparatus, further comprising a first imaging auxiliary pipe having the mist flowing region inside, wherein the first imaging auxiliary pipe is provided between the imaging pipe and the second gas supply pipe, the first imaging auxiliary pipe has a cross-sectional shape of a circular shape having a constant inner diameter, the first imaging auxiliary pipe is disposed along the vertical direction, the mist-containing gas flows in an order of the first gas supply pipe, the imaging pipe, the first imaging auxiliary pipe, and the second gas supply pipe along the counter-vertical direction, and the first imaging auxiliary pipe has an inner diameter that is smaller than an inner diameter of the constant inner diameter region in the imaging pipe and larger than an inner diameter of the second gas supply pipe.

2. The mist flow rate measuring apparatus according to claim 1, further comprising a second imaging auxiliary pipe having the mist flowing region inside, wherein the second imaging auxiliary pipe is provided between the first imaging auxiliary pipe and the second gas supply pipe, the second imaging auxiliary pipe has a cross-sectional shape of a circular shape, the mist-containing gas flows in an order of the first gas supply pipe, the imaging pipe, the first imaging auxiliary pipe, the second imaging auxiliary pipe, and the second gas supply pipe along the counter-vertical direction, the second imaging auxiliary pipe includes a lower connection part with the first imaging auxiliary pipe and an upper connection part with the second gas supply pipe, the lower connection part having an inner diameter that is equal to an inner diameter of the first imaging auxiliary pipe, and the upper connection part having an inner diameter that is equal to an inner diameter of the second gas supply pipe, and the second imaging auxiliary pipe has a tapered shape in which the inner diameter decreases towards the counter-vertical direction.

3. The mist flow rate measuring apparatus according to claim 1, wherein the imaging pipe has a cross-sectional shape of a circular shape having a constant inner diameter, and the imaging pipe has the constant inner diameter region in an entire of the imaging pipe.

4. The mist flow rate measuring apparatus according to claim 1, wherein the imaging pipe has an inner surface that is constituted of a material having hydrophilicity.

5. The mist flow rate measuring apparatus according to claim 1, wherein the imaging pipe includes an imaging main part, and a lower imaging auxiliary part, the imaging main part is coupled to the first gas supply pipe with the lower imaging auxiliary part interposed between the imaging main part and the first gas supply pipe, the imaging main part has a cross-sectional shape of a circular shape having a constant inner diameter, and the imaging main part is provided as the constant inner diameter region, and the lower imaging auxiliary part has a vertically protruding structure that inclines toward a side of the vertical direction toward an inner side.

6. The mist flow rate measuring apparatus according to claim 5, wherein the imaging pipe further includes an upper imaging auxiliary part, the imaging main part is coupled to the first imaging auxiliary pipe with the upper imaging auxiliary part interposed between the imaging main part and the first imaging auxiliary pipe, and the upper imaging auxiliary part has a vertically protruding structure that inclines toward a side of the vertical direction toward an inner side.

* * * * *